US011582755B2

(12) United States Patent
Ryu et al.

(10) Patent No.: US 11,582,755 B2
(45) Date of Patent: Feb. 14, 2023

(54) CONTROL SIGNALING TECHNIQUES FOR SIDELINK COMMUNICATIONS

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Chester, NJ (US); Tao Luo, San Diego, CA (US); Ling Ding, Chester, NJ (US); Kapil Gulati, Belle Mead, NJ (US); Jelena Damnjanovic, Del Mar, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/120,560

(22) Filed: Dec. 14, 2020

(65) Prior Publication Data
US 2021/0212044 A1 Jul. 8, 2021

Related U.S. Application Data

(60) Provisional application No. 62/957,466, filed on Jan. 6, 2020.

(51) Int. Cl.
*H04W 72/04* (2009.01)
*H04W 72/044* (2023.01)
(Continued)

(52) U.S. Cl.
CPC ......... *H04W 72/046* (2013.01); *H04W 28/26* (2013.01); *H04W 72/0453* (2013.01)

(58) Field of Classification Search
CPC .............. H04W 72/046; H04W 28/26; H04W 72/0453; H04W 92/18; H04W 72/02;
(Continued)

(56) References Cited

U.S. PATENT DOCUMENTS

2015/0215903 A1* 7/2015 Zhao ................... H04W 72/02 370/329
2018/0049219 A1* 2/2018 Gupta .............. H04W 72/0453
2018/0206260 A1* 7/2018 Khoryaev ......... H04W 72/1289

FOREIGN PATENT DOCUMENTS

EP 2856823 A2 4/2015

OTHER PUBLICATIONS

Ericsson: "Configuration of Unicast/Groupcast/Broadcast Sidelink V2X Communications", 3GPP Draft, 3GPP TSG-RAN WG2#105, TDoc R2-1901657—Configuration of Unicast Groupcast Broadcast Sidelink V2X Communications, 3rd Generation Partnership Project (3GPP), Mobile Competence Centre, 650, Route Des Lucioles, F-069, vol. RAN WG2, No. Athens, Greece, Feb. 25, 2019-Mar. 1, 2019, Feb. 14, 2019 (Feb. 14, 2019), XP051603010, pp. 1-4, Retrieved from the Internet: URL:http://www.3gpp.org/ftp/tsg%5Fran/WG2%5FRL2/TSGR2%5F105/Docs/R2%2D1901657%2Ezip [retrieved on Feb. 14, 2019] Paragraphs between proposal 4 and proposal 5.

(Continued)

*Primary Examiner* — Kiet Tang
(74) *Attorney, Agent, or Firm* — Holland & Hart LLP

(57) ABSTRACT

Methods, systems, and devices for wireless communications are described. Generally, the described techniques provide for determining shared resources associated with one or more user equipments (UEs) for sidelink communications, including control resources and data resources. A first UE may determine a first set of control resources in a first frequency band corresponding to a first group of UEs including the first UE. The first UE may transmit a sidelink request to reserve a subset of data resources to a second UE in the first group of UEs. The first UE may monitor for one or more sidelink responses indicating a positive sidelink response to the sidelink request, a negative sidelink response to the sidelink request, or both. The first UE may determine, (Continued)

based on monitoring for the one or more sidelink responses, whether to transmit a sidelink confirmation indicating a reservation of the data resources to the second UE.

28 Claims, 19 Drawing Sheets

(51) Int. Cl.
*H04W 72/0453* (2023.01)
*H04W 28/26* (2009.01)

(58) Field of Classification Search
CPC .. H04W 72/044; H04W 28/16; H04L 5/0048; H04L 5/0053; H04L 5/0094; H04L 5/0044; H04B 7/086
See application file for complete search history.

(56) References Cited

OTHER PUBLICATIONS

International Search Report and Written Opinion—PCT/US2020/065077—ISA/EPO—dated Apr. 13, 2021 (201387WO).
Nokia, et al., "Resource Announcement and Reservation Procedure for Mode 2 NR V2X", 3GPP Draft, R2-1906837, 3GPP TSG-RAN WG2 #Meeting #106, Resource Announcement and Reservation Procedure for Mode 2 NR V2X, 3rd Generation Partnership Project (3GPP), Mobile Competence Centre, 650, Route Des Lucioles, F-06921 Sophia vol. RAN WG2, No. Reno, USA, May 13, 2019-May 17, 2019, May 13, 2019 (May 13, 2019), XP051730289, 3 Pages, Retrieved from the Internet: URL: http://www.3gpp.org/ftp/Meetings%5F3GPP%5FSYNC/RAN2/Docs/R2%2D1906837%2Ezip [retrieved on May 13, 2019] Section 2.1.
NTT DOCOMO, Inc., "Sidelink Resource Allocation Mechanism for NR V2X", 3GPP Draft, R1-1902801, 3GPP TSG RAN WG1 #96, SL Resource Allocation Final, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600496, 11 Pages, Retrieved from the Internet: URL:http://www.3gpp.org/ftp/tsg%5Fran/WG1%5FRL1/TSGR1%5F96/Docs/R1%2D1902801%2Ezip [retrieved on Feb. 16, 2019] Section 2.2. 2.2.
OPPO: "Discussion on UE Autonomous RA in NR-V2X", 3GPP Draft, R1-1902389, 3GPP TSG RAN WG1 Meeting #96, MODE 2 RA, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600085, 14 Pages, Retrieved from the Internet: URL:http://www.3gpp.org/ftp/tsg%5Fran/WG1%5FRL1/TSGR1%5F96/Docs/R1%2D1902389%2Ezip [retrieved on Feb. 16, 2019] Section 2.2.

\* cited by examiner

US 11,582,755 B2

CONTROL SIGNALING TECHNIQUES FOR SIDELINK COMMUNICATIONS

CROSS REFERENCE

The present Applications for Patent claims the benefit of U.S. Provisional Patent Application No. 62/957,466 by RYU et al., entitled "CONTROL SIGNALING TECHNIQUES FOR SIDELINK COMMUNICATIONS," filed Jan. 6, 2020, assigned to the assignee hereof, and expressly incorporated by reference herein.

FIELD OF TECHNOLOGY

The following relates generally to wireless communications and more specifically to control signaling techniques for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some UEs may communicate with each other, for example, via one or more sidelink channels, and may utilize shared resources, for example, time resources, frequency resources, or spatial resources.

SUMMARY

The described techniques relate to improved methods, systems, devices, and apparatuses that support control signaling techniques for sidelink communications. Generally, the described techniques provide for increased system efficiency by implementing multiplexing, such as frequency divisional multiplexing (FDM), of control signaling for communications on one or more sidelinks. Various user equipments (UEs) may communicate with each other over sidelink control resources to claim shared data resources for sidelink data transmissions. The UEs may be configured in one or more groups in accordance with one or more resource allocation schemes. For example, a group of UEs may correspond to a frequency band of the sidelink control resources. Different groups of UEs may send or receive communications over corresponding frequency bands of the control resources, which may increase the efficiency and resource utilization in the system. In some examples, a base station may determine a set of UEs to include in a group (for example, based on a priority of communications from each UE or a proximity of the set of UEs to each other, among other examples) and may indicate the group to one or more UEs. Additionally or alternatively, a UE, which may function as a group leader, may determine a set of UEs to include in a group and may indicate the group to the UEs.

In some examples, at least some of the UEs, if not each UE, included in a group of UEs may be allocated one or more respective control blocks in the frequency band. For example, a first UE may claim a portion of the available data resources using a control block allocated to the first UE. The first UE may transmit a sidelink request to a second UE (for example, a target UE in the group of UEs). The sidelink request may indicate a set of data resources or a defined segment of the data resources for reservation. The first UE may monitor for sidelink responses from one or more UEs. For example, the second UE or another UE (for example, a non-target UE, a UE in another group of UEs, or both) may transmit a positive sidelink response, refrain from transmitting a positive sidelink response, transmit a negative sidelink response, or refrain from transmitting a negative sidelink response. In some examples, the first UE may transmit a sidelink confirmation indicating the reserved data resources over which the first UE will send one or more data transmissions based on the one or more sidelink responses indicating that the data resources are available or are unavailable.

One innovative aspect of the subject matter described in this disclosure can be implemented in a method for wireless communications. The method may include determining shared resources for communicating over one or more sidelink communication links, the shared resources including control resources and data resources, determining a first set of the control resources in a first frequency band corresponding to a first group of UEs, the first group of UEs including the first UE, transmitting, to a second UE in the first group of UEs on a transmission beam over a first control block of the first set of the control resources, a sidelink request to reserve a set of the data resources, where the first control block is allocated to the first UE, and monitoring, by the first UE on a receive beam over the first set of the control resources, for one or more sidelink responses.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to determine shared resources for communicating over one or more sidelink communication links, the shared resources including control resources and data resources, determine a first set of the control resources in a first frequency band corresponding to a first group of UEs, the first group of UEs including the first UE, transmit, to a second UE in the first group of UEs on a transmission beam over a first control block of the first set of the control resources, a sidelink request to reserve a set of the data resources, where the first control block is allocated to the first UE, and monitor, by the first UE on a receive beam over the first set of the control resources, for one or more sidelink responses.

Another innovative aspect of the subject matter described in this disclosure can be implemented in an apparatus for wireless communications. The apparatus may include means for determining shared resources for communicating over one or more sidelink communication links, the shared resources including control resources and data resources, determining a first set of the control resources in a first frequency band corresponding to a first group of UEs, the first group of UEs including the first UE, transmitting, to a second UE in the first group of UEs on a transmission beam over a first control block of the first set of the control resources, a sidelink request to reserve a set of the data resources, where the first control block is allocated to the first UE, and monitoring, by the first UE on a receive beam over the first set of the control resources, for one or more sidelink responses.

Another innovative aspect of the subject matter described in this disclosure can be implemented in a non-transitory computer readable medium storing code for wireless communications. The code may include instructions executable by a processor to determine shared resources for communicating over one or more sidelink communication links, the shared resources including control resources and data resources, determine a first set of the control resources in a first frequency band corresponding to a first group of UEs, the first group of UEs including the first UE, transmit, to a second UE in the first group of UEs on a transmission beam over a first control block of the first set of the control resources, a sidelink request to reserve a set of the data resources, where the first control block is allocated to the first UE, and monitor, by the first UE on a receive beam over the first set of the control resources, for one or more sidelink responses.

Another innovative aspect of the subject matter described in this disclosure can be implemented in a method for wireless communications. The method may include determining shared resources for communicating over one or more sidelink communication links, the shared resources including control resources and data resources, determining a first set of the control resources in a first frequency band corresponding to a first group of UEs, the first group of UEs including the first UE and a second UE, monitoring, on a receive beam over a first control block of the first set of the control resources, for a sidelink request from the second UE to reserve a set of the data resources, the first control block allocated to the second UE and the sidelink request indicating that the first UE is a target UE of the sidelink request, and determining, based on the monitoring, whether to transmit a sidelink response to the second UE on a transmission beam over the first set of the control resources, the sidelink response including a positive sidelink response to the sidelink request or a negative sidelink response to the sidelink request, the positive sidelink response indicating that the set of the data resources are available and the negative sidelink response indicating that the set of the data resources are unavailable.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to determine shared resources for communicating over one or more sidelink communication links, the shared resources including control resources and data resources, determine a first set of the control resources in a first frequency band corresponding to a first group of UEs, the first group of UEs including the first UE and a second UE, monitor, on a receive beam over a first control block of the first set of the control resources, for a sidelink request from the second UE to reserve a set of the data resources, the first control block allocated to the second UE and the sidelink request indicating that the first UE is a target UE of the sidelink request, and determine, based on the monitoring, whether to transmit a sidelink response to the second UE on a transmission beam over the first set of the control resources, the sidelink response including a positive sidelink response to the sidelink request or a negative sidelink response to the sidelink request, the positive sidelink response indicating that the set of the data resources are available and the negative sidelink response indicating that the set of the data resources are unavailable.

Another innovative aspect of the subject matter described in this disclosure can be implemented in an apparatus for wireless communications. The apparatus may include means for determining shared resources for communicating over one or more sidelink communication links, the shared resources including control resources and data resources, determining a first set of the control resources in a first frequency band corresponding to a first group of UEs, the first group of UEs including the first UE and a second UE, monitoring, on a receive beam over a first control block of the first set of the control resources, for a sidelink request from the second UE to reserve a set of the data resources, the first control block allocated to the second UE and the sidelink request indicating that the first UE is a target UE of the sidelink request, and determining, based on the monitoring, whether to transmit a sidelink response to the second UE on a transmission beam over the first set of the control resources, the sidelink response including a positive sidelink response to the sidelink request or a negative sidelink response to the sidelink request, the positive sidelink response indicating that the set of the data resources are available and the negative sidelink response indicating that the set of the data resources are unavailable.

Another innovative aspect of the subject matter described in this disclosure can be implemented in a non-transitory computer readable medium storing code for wireless communications. The code may include instructions executable by a processor to determine shared resources for communicating over one or more sidelink communication links, the shared resources including control resources and data resources, determine a first set of the control resources in a first frequency band corresponding to a first group of UEs, the first group of UEs including the first UE and a second UE, monitor, on a receive beam over a first control block of the first set of the control resources, for a sidelink request from the second UE to reserve a set of the data resources, the first control block allocated to the second UE and the sidelink request indicating that the first UE is a target UE of the sidelink request, and determine, based on the monitoring, whether to transmit a sidelink response to the second UE on a transmission beam over the first set of the control resources, the sidelink response including a positive sidelink response to the sidelink request or a negative sidelink response to the sidelink request, the positive sidelink response indicating that the set of the data resources are available and the negative sidelink response indicating that the set of the data resources are unavailable.

Another innovative aspect of the subject matter described in this disclosure can be implemented in a method for wireless communications. The method may include determining shared resources for communicating over one or more sidelink communication links, the shared resources including control resources and data resources, determining a first set of the control resources in a first frequency band corresponding to a first group of UEs, the first group of UEs including the first UE and a second UE, monitoring, on a receive beam over the first set of the control resources in the first frequency band, for a first sidelink request from the second UE, receiving, based on the monitoring, a second sidelink request from a third UE to reserve a set of the data resources, the second sidelink request indicating that a fourth UE is a target UE of the second sidelink request, a second group of UEs including the third UE and the fourth UE, and determining, based on receiving the second sidelink request, whether to transmit a sidelink response to the third UE, the sidelink response indicating a positive response to the second sidelink request to reserve the set of the data resources or a negative response to the second sidelink request to reserve the set of the data resources.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to determine shared resources for communicating over one or more sidelink communication links, the shared resources including control resources and data resources, determine a first set of the control resources in a first frequency band corresponding to a first group of UEs, the first group of UEs including the first UE and a second UE, monitor, on a receive beam over the first set of the control resources in the first frequency band, for a first sidelink request from the second UE, receive, based on the monitoring, a second sidelink request from a third UE to reserve a set of the data resources, the second sidelink request indicating that a fourth UE is a target UE of the second sidelink request, a second group of UEs including the third UE and the fourth UE, and determine, based on receiving the second sidelink request, whether to transmit a sidelink response to the third UE, the sidelink response indicating a positive response to the second sidelink request to reserve the set of the data resources or a negative response to the second sidelink request to reserve the set of the data resources.

Another innovative aspect of the subject matter described in this disclosure can be implemented in an apparatus for wireless communications. The apparatus may include means for determining shared resources for communicating over one or more sidelink communication links, the shared resources including control resources and data resources, determining a first set of the control resources in a first frequency band corresponding to a first group of UEs, the first group of UEs including the first UE and a second UE, monitoring, on a receive beam over the first set of the control resources in the first frequency band, for a first sidelink request from the second UE, receiving, based on the monitoring, a second sidelink request from a third UE to reserve a set of the data resources, the second sidelink request indicating that a fourth UE is a target UE of the second sidelink request, a second group of UEs including the third UE and the fourth UE, and determining, based on receiving the second sidelink request, whether to transmit a sidelink response to the third UE, the sidelink response indicating a positive response to the second sidelink request to reserve the set of the data resources or a negative response to the second sidelink request to reserve the set of the data resources.

Another innovative aspect of the subject matter described in this disclosure can be implemented in a non-transitory computer readable medium storing code for wireless communications. The code may include instructions executable by a processor to determine shared resources for communicating over one or more sidelink communication links, the shared resources including control resources and data resources, determine a first set of the control resources in a first frequency band corresponding to a first group of UEs, the first group of UEs including the first UE and a second UE, monitor, on a receive beam over the first set of the control resources in the first frequency band, for a first sidelink request from the second UE, receive, based on the monitoring, a second sidelink request from a third UE to reserve a set of the data resources, the second sidelink request indicating that a fourth UE is a target UE of the second sidelink request, a second group of UEs including the third UE and the fourth UE, and determine, based on receiving the second sidelink request, whether to transmit a sidelink response to the third UE, the sidelink response indicating a positive response to the second sidelink request to reserve the set of the data resources or a negative response to the second sidelink request to reserve the set of the data resources.

Another innovative aspect of the subject matter described in this disclosure can be implemented in a method for wireless communications. The method may include determining shared resources for sidelink communications between at least a first UE and a second UE, the shared resources including control resources and data resources, assigning the first UE to a first group of UEs and the second UE to a second group of UEs, where the first group of UEs is associated with a first set of the control resources in a first frequency band and the second group of UEs is associated with a second set of the control resources in a second frequency band, and transmitting an indication, to at least one of the first UE or the second UE, that the first UE is assigned to the first group of UEs, or that the second UE is assigned to the second group of UEs, or both.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to determine shared resources for sidelink communications between at least a first UE and a second UE, the shared resources including control resources and data resources, assign the first UE to a first group of UEs and the second UE to a second group of UEs, where the first group of UEs is associated with a first set of the control resources in a first frequency band and the second group of UEs is associated with a second set of the control resources in a second frequency band, and transmit an indication, to at least one of the first UE or the second UE, that the first UE is assigned to the first group of UEs, or that the second UE is assigned to the second group of UEs, or both.

Another innovative aspect of the subject matter described in this disclosure can be implemented in an apparatus for wireless communications. The apparatus may include means for determining shared resources for sidelink communications between at least a first UE and a second UE, the shared resources including control resources and data resources, assigning the first UE to a first group of UEs and the second UE to a second group of UEs, where the first group of UEs is associated with a first set of the control resources in a first frequency band and the second group of UEs is associated with a second set of the control resources in a second frequency band, and transmitting an indication, to at least one of the first UE or the second UE, that the first UE is assigned to the first group of UEs, or that the second UE is assigned to the second group of UEs, or both.

Another innovative aspect of the subject matter described in this disclosure can be implemented in a non-transitory computer readable medium storing code for wireless communications. The code may include instructions executable by a processor to determine shared resources for sidelink communications between at least a first UE and a second UE, the shared resources including control resources and data resources, assign the first UE to a first group of UEs and the second UE to a second group of UEs, where the first group of UEs is associated with a first set of the control resources in a first frequency band and the second group of UEs is associated with a second set of the control resources in a second frequency band, and transmit an indication, to at least one of the first UE or the second UE, that the first UE is assigned to the first group of UEs, or that the second UE is assigned to the second group of UEs, or both.

DETAILED DESCRIPTION

Figure 1:
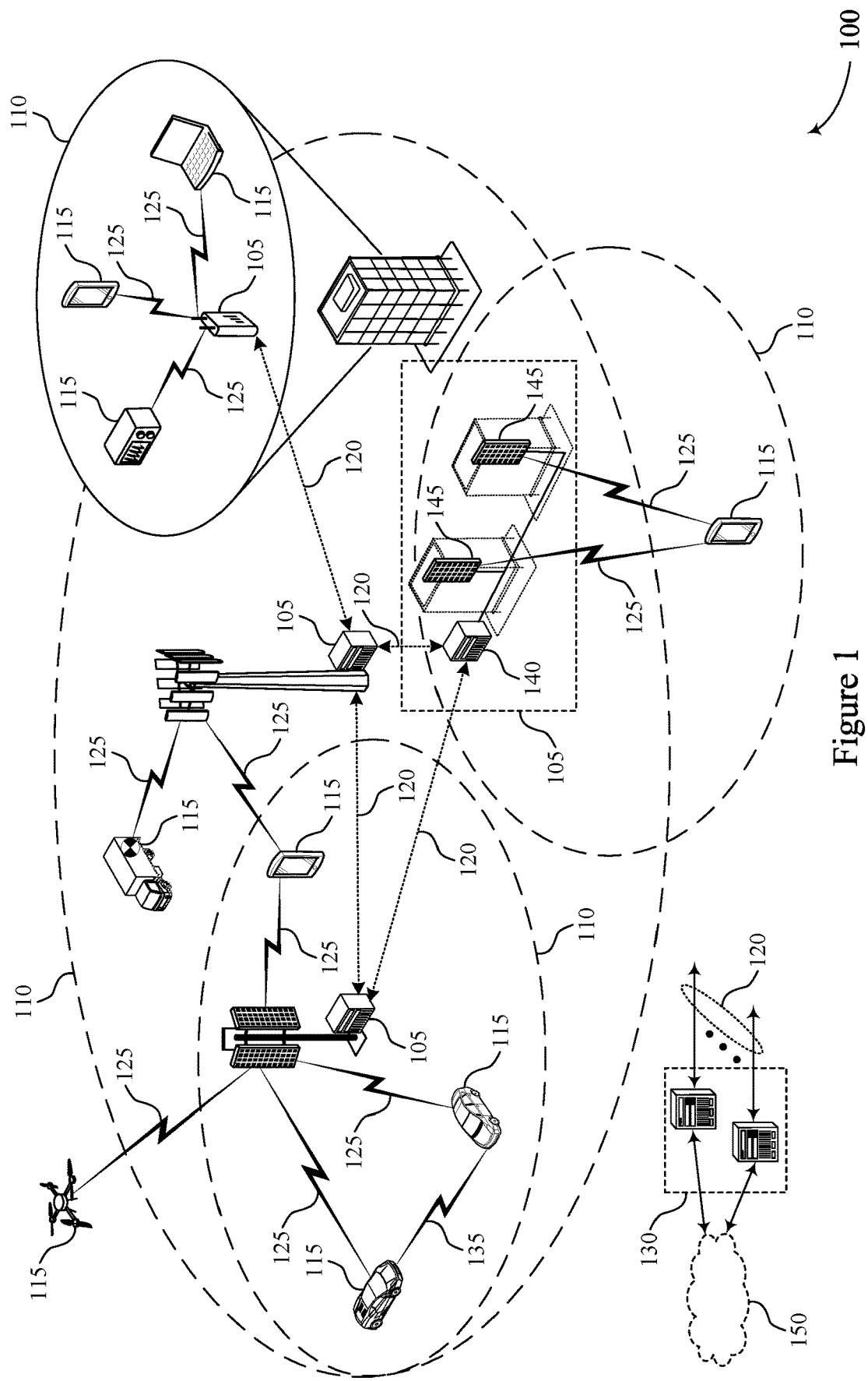
FIG. 1 illustrates an example of a system for wireless communications that supports control signaling techniques for sidelink communications in accordance with aspects of the present disclosure.

In some examples of a wireless communications system, a base station may communicate with one or more user equipments (UEs) via downlink signals and uplink signals. The UEs may also communicate with each other via one or more sidelink signals. In some examples, the base station may allocate shared resources for sidelink communications (such as, communications between UEs). The UEs may perform beam training procedures to identify one or more characteristics or parameters (such as directional beams) on which to communicate with each other, and the UEs may communicate with each other on sidelink communication links using shared resources (for example, resources from a pool of shared resources allocated by the base station).

A shared resource pool for the sidelink communications may, in some examples, include control resources and data resources. UEs may send or receive control signals over the control resources to reserve data resources for sidelink communications. The UEs may be allocated a portion of the control resources (for example, one slot of the control resources) for such control signaling. In some examples, however, a UE may not utilize the entirety of the UE's allocated portion of the control resources. In such examples, the remaining control resources of the allocated portion may remain unused (for example, there may be an over-allocation of resources to the UE), which may result in system inefficiency, increased latency, and decreased user experience, among other issues.

Various aspects generally relate to sidelink communications, and more specifically to multiplexing, such as frequency divisional multiplexing (FDM), of control signaling over control resources. The UEs in the wireless communications system may be configured in one or more groups in accordance with a resource allocation scheme. For example, a group of UEs may be configured to communicate via sidelink control resources in a corresponding frequency band. Different groups of UEs may send or receive communications via allocated control resources in different respective frequency bands. For example, a first group of UEs may be allocated control blocks in a first frequency band and a second group of UEs may be allocated control blocks in a second frequency band. A control block may have a duration of one or more transmission time intervals (for example, 1 slot). The UEs in the first group may communicate with each other using the control resources over the first frequency band to determine which UEs can request and use data resources from the pool of shared resources.

In some examples, at least some of the UEs, if not each UE, included in a group of UEs may be allocated one or more respective control blocks in the frequency band. For example, a first UE may claim a portion of the available data resources using a control block allocated to the first UE. The first UE may transmit a sidelink request to a second UE (for example, a target UE in the group of UEs). The sidelink request may indicate a set of data resources or a defined segment of the data resources for reservation. The first UE may monitor for sidelink responses from one or more UEs. For example, the second UE or another UE (for example, a non-target UE, a UE in another group of UEs, or both) may transmit a positive sidelink response, refrain from transmitting a positive sidelink response, transmit a negative sidelink response, or refrain from transmitting a negative sidelink response. In some examples, the first UE may transmit a sidelink confirmation indicating the reserved data resources over which the first UE will send one or more data transmissions based on the one or more sidelink responses indicating that the data resources are available or are unavailable. In some examples, various groups of UEs may have different sizes, a UE may belong to one or more groups, or any combination thereof as described herein.

Particular aspects of the subject matter described herein may be implemented to realize one or more advantages. By multiplexing control signaling over control resources, the described techniques may support increased system efficiency (e.g., relatively efficient resource utilization). Additionally or alternatively, the described techniques may support relatively high reliability for communications.

Aspects of the disclosure are initially described in the context of wireless communications systems. Aspects of the disclosure are further illustrated by and described with reference to resource allocation schemes. Aspects of the disclosure are further illustrated by and described with reference to apparatus diagrams, system diagrams, and flowcharts that relate to control signaling techniques for sidelink communications.

FIG. 1 illustrates an example of a wireless communications system 100 that supports control signaling techniques for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated with respect to FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown with respect to FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown with respect to FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency divisional multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T\_s=1/((\Delta f\_max \cdot N\_f))$ seconds, where $\Delta f\_max$ may represent the maximum supported subcarrier spacing, and $N\_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N\_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency divisional multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from covering smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) while receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, while receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Each of the UEs 115 may be assigned to or otherwise configured in one or more groups in accordance with one or more resource allocation schemes as described herein. For example, a wireless device (such as a base station 105 or a group leader UE 115, among other examples of wireless devices) may assign a set of UEs 115 to a group. The set of UEs 115 may communicate sidelink control signals (for example, including sidelink requests, sidelink responses and sidelink confirmation messages) based on the assigned grouping. For example, at least some of the set of UEs 115 may be allocated one or more control blocks in a frequency band corresponding to the group. The UEs 115 may monitor for communications or transmit communications (or both) to other UEs 115 in the group using the allocated control blocks of the frequency band. In some examples, the group, the control blocks, or both, may be allocated based on priorities of communications between one or more UEs 115. For example, a UE 115 may be assigned to a group with a lower frequency band, for example, if the UE 115 is a relatively low priority UE 115 (e.g., the UE 115 may have relatively low priority communications). Additionally or alternatively, the UE 115 may be allocated a control block occurring earlier in the control resources, for example, if the UE 115 has a relatively high priority. In some examples, the groups of UEs 115 may be updated (for example, based on a request to be grouped with a UE 115 in another group or after a determined amount of time, among other examples) or may have different sizes (for example, different quantities of UEs 115 in the groups or different quantities of control blocks allocated to the UEs in different groups or to the UEs in the same group). Additionally or alternatively, a UE 115 may be included in multiple groups based on one or more capabilities of the UE 115, such as a number of beams available for sidelink communications. Such techniques may realize one or more advantages, such as more efficient communications, resource utilization, and reliable communications, among other advantages.

Figure 2:
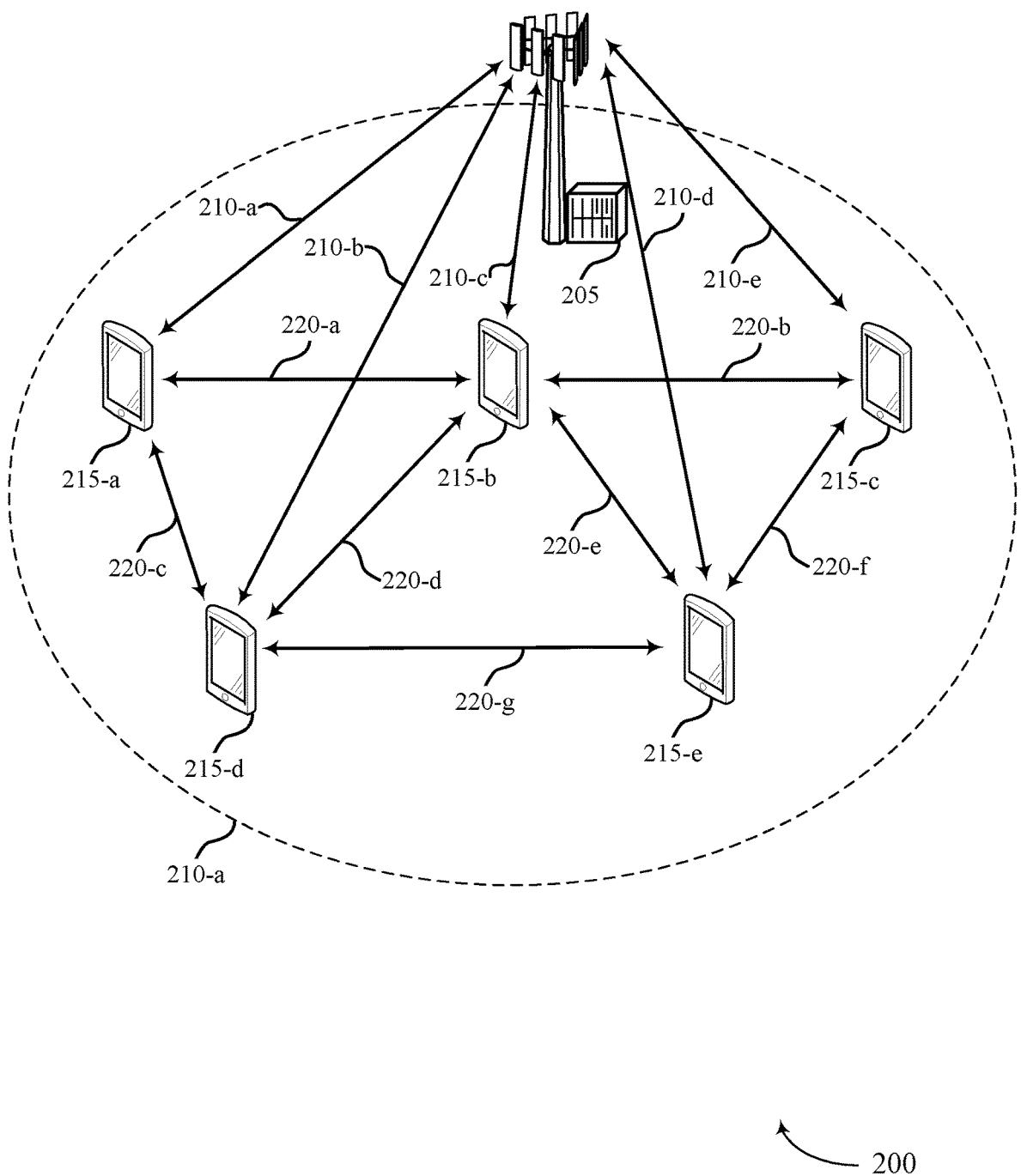
FIG. 2 illustrates an example of a wireless communications system that supports control signaling techniques for sidelink communications in accordance with aspects of the present disclosure.

FIG. 2 illustrates an example of a wireless communications system 200 that supports control signaling techniques for sidelink communications in accordance with aspects of the present disclosure. In some examples, wireless communications system 200 may implement aspects of wireless communications system 100.

A base station 205 may serve one or more UEs 215 located within a geographic area 210-a. For example, the base station 205 may serve the UE 215-a, the UE 215-b, the UE 215-c, the UE 215-d, or the UE 215-e. The UEs 215 may communicate with each other via one or more sidelink connections 220 (for example, the sidelink connection 220-a, the sidelink connection 220-b, the sidelink connection 220-c, the sidelink connection 220-d, the sidelink connection 220-e, the sidelink connection 220-f, or the sidelink connection 220-g). The base station 205 may communicate with the UEs 215 via one or more bidirectional communication links 210 (for example, the bidirectional communication link 210-a, the bidirectional communication link 210-b, the bidirectional communication link 210-c, the bidirectional communication link 210-d, or the bidirectional communication link 210-e).

In some examples, the base station 205 may allocate sidelink resources (for example, shared resources for sidelink communications between the UEs 215) to the UEs 215 via one or more of the bidirectional communication links 210. The shared resources may include data resources and control resources in some examples. The UEs 215 may communicate with each other (for example, via sidelink connections 220) to claim at least some of the data resources. The UEs 215 may split the data resources (for example, dynamically or as indicated by one or more other devices such as the base station 205) into sub-pools, where each sub-pool may be shared, may be different in size, or both, among other differences or similarities. In some examples, a UE 215 may claim a sub-pool of the data resources. The base station 205 may restrict the UEs 215 from claiming the entirety of a pool of shared resources, and may permit the UEs 215 to claim one or more sub-pools (for example, an overall subset) of the shared resources.

Other techniques for determining which of the UEs 215 will have access to data resources may result in system inefficiency. In some examples, the base station 205 may communicate with the UEs 215 via the bidirectional communication links 210 and may allocate one or more of the shared resources to one or more respective UEs 215 for each sidelink communication. Such sidelink communication allocation, however, may result in an unnecessary increase in signaling overhead and a decrease in system efficiency. In some examples, the UEs 215 may autonomously contend for data resources. In such examples, resources may be underutilized (resulting in inefficient use of the data resources), or over-utilized (resulting in increased interference and failed transmissions, and decreased user experience). That is, if the UEs are configured to be overly cautious about avoiding collisions, or are not configured to make appropriate use of spatial resources (for example, beamforming techniques), then otherwise-available resources may remain unused. Additionally, or alternatively, if too many UEs are concurrently transmitting on the same shared resources (for example, on the beams that interfere with each other), then link quality may degrade, which may result in one or more of failed transmissions, multiple retransmissions, increased system latency, or other problems. Thus, to increase system efficiency and decrease interference, among other advantages, the UEs may dynamically claim shared resources, for example, according to a schedule, and may communicate with each other to identify and decrease interference while making efficient use of available shared resources.

The UEs 215 may determine a priority schedule, which may determine an order in which the UEs 215 may take turns attempting to claim data resources. The UEs 215 may communicate with each other, autonomously (for example, without formal scheduling by the base station 205), using control resources according to the priority schedule. In some examples, the base station 205 may transmit, to the UEs 215, an indication of the priority schedule. In some examples, the UEs 215 may dynamically determine the priority schedule (for example, without receiving an indication of the priority schedule from the base station). In some examples, the priority schedule may be associated with one or more frequency bands (for example, a higher frequency band may correspond to a relatively higher priority group of UEs), one or more control blocks (for example, a control block occurring in an earlier slot may correspond to a relatively high priority UE, such as a UE with relatively high priority communications, than control block occurring in a later slot), or both.

The control resources may include resources allocated for signal types. For example, the UEs 215 may determine (for example, via preconfigured information or signaling from the base station 205), resources for sidelink request messages, positive sidelink response and negative sidelink response messages, and sidelink confirmation messages, as described with reference to greater detail with respect to FIG. 3. The control resources may include multiple portions of resources, which may be referred to as control blocks. Each control block in the control resources may include resources for one or more of a sidelink request message, a positive sidelink response message, a negative sidelink response message, or a sidelink confirmation. A UE 215 that is scheduled, according to the priority schedule, for a particular control block may transmit a sidelink request message to a target UE 215 over the control block. The sidelink request message may indicate that the UE 215 intends to transmit a data message over a portion of the shared resources.

If a UE 215 was scheduled to receive a data transmission over a portion of the data resources over a previous control block, then that the UE 215 may have priority and may be able to object to the transmission being scheduled in the current control block. For instance, over a first control block, the UE 215-a may communicate with UE 215-b, and may determine to send a data transmission using a portion of the data resources. The UE 215-b may receive the data transmission from the UE 215-a using a first receive beam. Over a second control block, the UE 215-d may be scheduled according to the priority schedule, and may transmit a sidelink request message to the UE 215-e. The UE 215-e may receive the sidelink request message using a second receive beam. If the UE 215-e is available for the transmission, then the UE 215-e may transmit a positive sidelink response message. However, the UE 215-b may be monitoring, using the first receive beam, over the second control block, and may receive the sidelink request message on the first receive beam. The UE 215-b may determine that a data transmission from the UE 215-d to the UE 215-e may interfere with the previously scheduled data transmission on the first receive beam. In such examples, because the UE 215-*a* is a higher priority UE 215 than the UE 215-*d* (for example, because UE 215-*a* scheduled UE 215-*b* for a data transmission over a previous control block), the UE 215-*b* may transmit a negative sidelink response message. The UE 215-*d* may receive the negative sidelink response message, and may determine to abort or refrain from transmitting the data transmission to the UE 215-*e*.

In some examples, the wireless communications system 200 may implement multiplexing techniques for control signaling to realize more efficient communications as described herein. For example, the UEs 215 may be configured to be in one or more groups in accordance with a resource allocation scheme. A wireless device (such as the base station 205, a group leader UE 215, among other examples of wireless devices) may assign a set of UEs 215 to a group. In some examples, at least one the UE 215 may receive a signal from the base station 205 indicating that the UE 215 can act as a group leader and assign each of one or more sets of UEs 215 to respective groups. The UE 215 acting as the group leader may then transmit an indication of the sets of UEs 215 that have been assigned to the groups to the base station 205. The base station 205 may, in some examples, configure one or more parameters associated with the shared resource pool (including control resources and data resources) based on aspects of the assigned grouping (such as the quantity of UEs in one or more groups or the quantity of groups of UEs, among other examples). Additionally or alternatively, one or more of the UEs 215 may autonomously act (for example, without receiving an instructions signal from the base station 205) as a group leader and assign a set of UEs 215 to one or more groups.

The set of UEs 215 may communicate sidelink control signals (for example, sidelink requests, sidelink responses, and sidelink confirmation messages) based on the assigned group associated with the set of UEs 215. For example, one or more UEs 215 of the set of UEs 215 may be allocated one or more control blocks in a first frequency band corresponding to the group. The UEs 215 may monitor for communications or transmit communications (or both) to other UEs 215 in the group using the allocated control blocks of the frequency band. In some examples, the group, the control blocks, or both, may be allocated based on one or more priorities of one or more UEs 215 (for example, a UE 215 with relatively high priority communications or relatively low priority communications). For example, a UE 215 may be assigned to a group with a lower frequency band, for example, if the UE 215 is a relatively low priority UE 215. Additionally or alternatively, the UE 215 may be allocated a control block occurring earlier in the control resources, for example, if the UE 215 has a relatively high priority. In some examples, the groups of UEs 215 may be updated (for example, based on a request to be grouped with a UE 215 in another group or after a determined amount of time, among other examples) or may have different sizes (for example, different quantities of UEs 215 or control blocks). Additionally or alternatively, a UE 215 may be included in multiple groups based on one or more capabilities of the UE 215, such as a number of beams available for sidelink communications. Such techniques may realize one or more advantages, such as more efficient communications and resource utilization, among other advantages.

Figure 3:
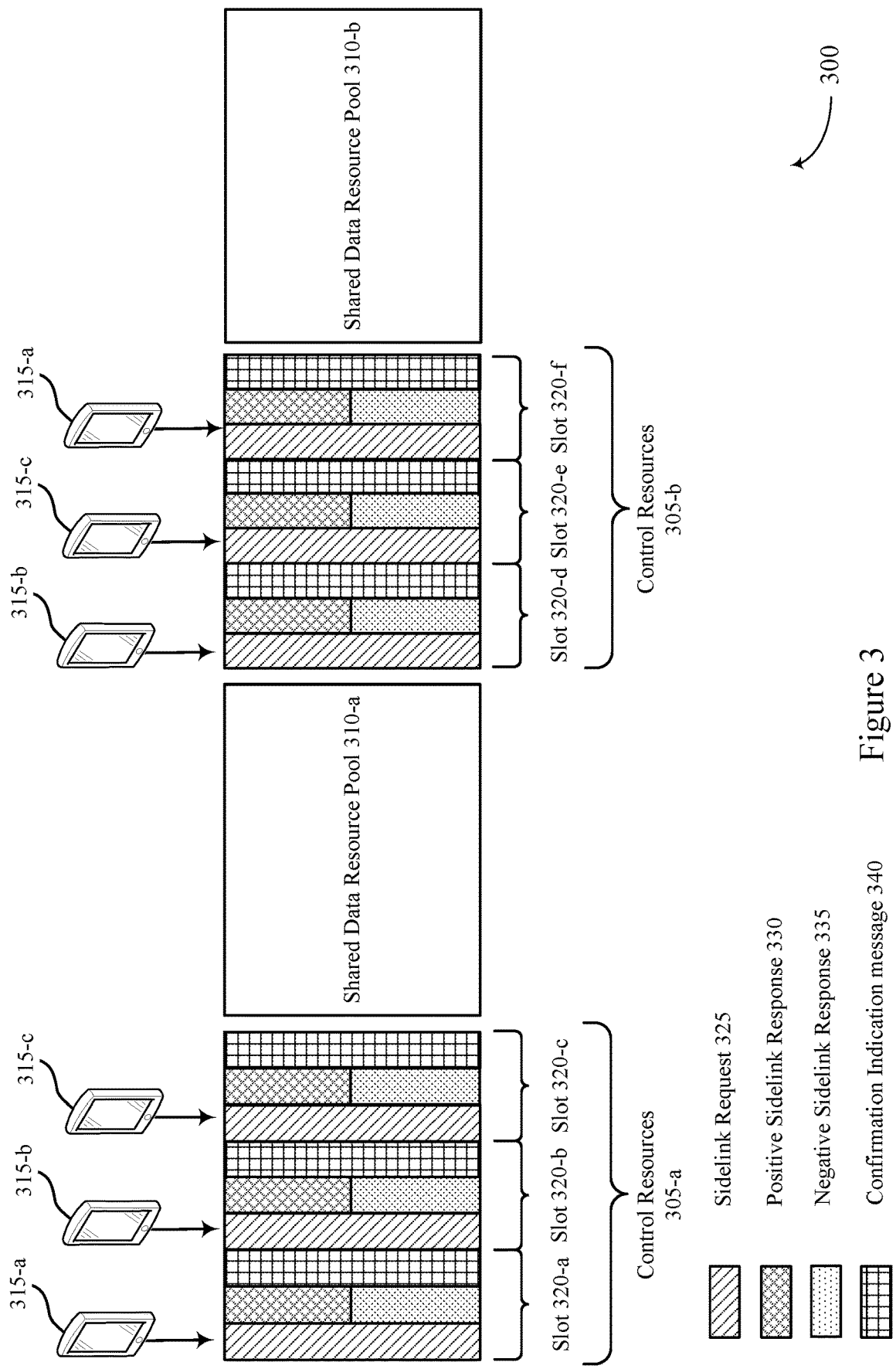
FIG. 3 illustrates an example of a resource allocation scheme that supports control signaling techniques for sidelink communications in accordance with aspects of the present disclosure.

FIG. 3 illustrates an example of a resource allocation scheme 300 that supports control signaling techniques for sidelink communications in accordance with aspects of the present disclosure. In some examples, resource allocation scheme 300 may implement aspects of wireless communications systems 100 and 200.

In some examples, multiple UEs 315 may communicate with each other via one or more sidelink connections. A base station 105 may allocate shared resources to one or more of the UEs 315. The shared resources may include control resources 305 and shared data resource pools 310. The UEs 315 may determine which UE 315 will transmit and receive in the shared data resource pools 310 without additional signaling from a base station 105, and may increase the number of transmissions in the shared data resource pools 310 while decreasing interference, among other advantages. The UEs 315 may also perform beam training procedures to determine which transmit and receive beams to use for communicating with each other. The UEs 315 may utilize these beams while transmitting the control signals as well as data.

The UEs 315 may communicate with each other on the control resources 305 to claim data resources from the shared data resource pools 310. The control resources may include one or more control blocks. Each control block may have a duration (for example, 1 slot). One or more control blocks may include resources allocated for communicating different types of signals. For example, each control block may include resources allocated for one or more of a sidelink request message 325 (which may also be referred to as a sidelink request), a positive sidelink response message 330 (which may also be referred to as a positive sidelink response), a negative sidelink response messages 335 (which may also be referred to as a negative sidelink response), or a sidelink confirmation message 340 (which may also be referred to as a sidelink confirmation). A UE 315 may transmit a sidelink request 325 to a target UE 315 to claim data resources for data transmissions. A sidelink request 325 may include a UE identifier for the target UE 315. Each of the other UEs 315 may monitor for the sidelink requests 325, for example, to determine whether the respective other UE 315 is the target UE 315 or to determine if a data transmission from the sidelink-request-transmitting UE 315 will cause interference above a threshold to a previously scheduled data transmission associated with the respective other UE 315.

In response to receiving a sidelink request 325, a target UE 315 may transmit a positive sidelink response 330 to accept a data transmission. For example, the target UE 315 may transmit a positive sidelink response message if it determines that it is not already scheduled to receive a data transmission or if a higher priority transmission will not cause interference above a threshold, among other examples. A non-target UE 315 may transmit a negative sidelink response 335 in response to a sidelink request 325 to object to a data transmission between the UE 315 that transmitted the sidelink request 325 and the target UE 315. For example, the non-target UE 315 may transmit a negative sidelink response 335 if a data transmission from the UE 315 that transmitted the sidelink request 325 will interfere with a previously scheduled data transmission for the non-target UE. A positive sidelink response 330 and a negative sidelink response 335 may occupy a same time (for example, may be transmitted in overlapping time resources over a portion of a slot 320) and may occupy different frequency resources (for example, tones).

A UE 315 that transmitted a sidelink request 325 may transmit a sidelink confirmation 340 to confirm a scheduled data transmission or may refrain from transmitting a sidelink confirmation 340 to indicate that a data transmission has been aborted or that it will refrain from performing the data transmission. In some examples, if the sidelink-request-transmitting UE 315 receives a positive sidelink response 330 from the target UE 315 and no negative sidelink response messages 335, then it may transmit the sidelink confirmation message 340. In some examples, if the UE 315 does not receive a positive sidelink response 330 from the target UE 315, or if the UE 315 receives one or more negative sidelink response messages 335 from one or more other UEs 315, (or if both occur), then the UE 315 may refrain from transmitting the sidelink confirmation message and not proceed with the data transmission.

The UEs 315 may take turns, according to the priority schedule, attempting to claim data resources from a shared data resource pool 310 over corresponding control resources 305. At least some, if not all, of the UEs 315 may be aware of the priority schedule, and may thus monitor, transmit, or receive, or any combination thereof, over the resources allocated for the control signals over respective control blocks.

In some examples, a base station 105 may transmit a downlink indication of the priority schedule. For example, the priority schedule may indicate that UE 315-a is assigned a control block over a slot 320-a of control resources 305-a, that UE 315-b is assigned a control block over a slot 320-b of control resources 305-a, and that UE 315-c is assigned a control block over a slot 320-c of control resources 305-a. One or more of the UEs 315 may attempt to claim data resources from the shared data resource pool 310-a over only their respective assigned control blocks. That is, over the slot 320-a, the UE 315-a may transmit a sidelink request 325, but UE 315-b and UE 315-c may refrain from, or may be prohibited from, transmitting sidelink request messages over the slot 320-a. Similarly, the UE 315-b may transmit a sidelink request 325 over the slot 320-b and UE 315-c may transmit a sidelink request 325 over the slot 320-c. The same downlink indication of the priority schedule, or a new indication of a priority schedule, may indicate assignments for control resources 305-a, or may include a pattern or set of rules for subsequent control resources (for example, a rotation schedule, a round robin rule, among other examples).

In some examples, the downlink indication may indicate that UE 315-b is assigned a control block over a slot 320-d of control resources 305-b, that UE 315-c is assigned a control block over a slot 320-e of control resources 305-b, and that UE 315-a is assigned a control block over a slot 320-f of control resources 305-b. In some examples, the UEs 315 may communicate according to the priority schedule across multiple control resources 305 until the base station 105 transmits a new indication (for example, including a new or updated priority schedule). In some examples, the base station may transmit a new indication of a priority schedule prior to each set of control resources 305-b.

In some other examples, the UEs 315 may determine a priority schedule without input from the base station 105. For instance, the UEs 315 may determine a rotating priority schedule, where the UE 315-a is assigned the first slot (for example, the slot 320-a) of a first set of control resources 305-a, the third slot (for example, slot 320-f) of a second set of control resources 305-b, the second slot of a subsequent set of control resources 305-c (not shown), and so on across multiple sets of control resources 305-a.

A UE 315 that is assigned a control block that is earlier than another control block may have a higher priority than a UE 315 that is assigned to a later control block. That is, the UE 315-a may have a higher priority than the UE 315-b, and if the UE 315-a is scheduled for a transmission over the slot 320-a, then the UE 315-a or a UE 315 scheduled to communicate with the UE 315-a may object to a transmission scheduled by the UE 315-b over the slot 320-b.

The UEs 315 may attempt to claim data resources from the shared data resource pools 310 according to the priority schedule. For example, the UE 315-a may transmit, according to the priority schedule, a sidelink request 325 over a first portion of the slot 320-a to a target UE 315 (for example, the UE 315-c). In some examples, the UE 315-b and the UE 315-c may direct respective receive beams toward the UE 315-a based on the priority schedule, among other factors. The UE 315-c may receive the sidelink request 325 over the first portion of the slot 320-a and may transmit a positive sidelink response 330 over the second portion of the slot 320-a. The UE 315-b may also receive the sidelink request 325 over the first portion of the slot 320-a. If the UE 315-b determines that it does not have a conflicting data transmission scheduled, among other conditions, then UE 315-b may refrain from transmitting a negative sidelink response 335 over the second portion of the slot 320-a. Over the third portion of the slot 320-a, having received the positive sidelink response 330 from the UE 315-c, and having received no negative sidelink response messages 335 from any of the other UEs 315 (such as the UE 315-b), the UE 315-a may transmit a sidelink confirmation 340 to UE 315-c. The UE 315-c may thus be scheduled to receive a data transmission on a set or portion of data resources from the shared data resource pool 310-a on the same receive beam on which it received the sidelink request 325 and the sidelink confirmation message 340.

Over the slot 320-b, the UE 315-b may attempt to schedule a data transmission with a fourth UE 315 (not shown). The UE 315-b may transmit a sidelink request 325 to the fourth UE 315 over the first portion of the slot 320-b. Over the second portion of the slot 320-b, the fourth UE may transmit a positive sidelink response 330 to the UE 315-b. The UE 315-c may monitor, over the first portion of the slot 320-b, for the sidelink request 325 from the UE 315-b using the same receive beam on which UE 315-a scheduled the data transmission over the slot 320-a. If the UE 315-c receives the sidelink request 325 from the UE 315-b over the slot 320-b on that beam, then the UE 315-c may measure interference, among other aspects, of the potential data transmission from the UE 315-b to the fourth UE on the that receive beam. If the interference is above a threshold (for example, the potential data transmission will create a relatively low signal to interference plus noise ratio (SINR) on that receive beam), then the UE 315-c may object to the scheduling of a data transmission between UE 315-b and the target UE 315 of the slot 320-b. That is, the UE 315-c may transmit a negative sidelink response 335 over the slot 320-b because UE 315-c was scheduled by the UE 315-a, which has a higher priority than the UE 315-b. Upon receiving the negative sidelink response 335 over the second portion of the slot 320-b, the UE 315-b may abort the data transmission, and may refrain from transmitting a sidelink confirmation 340 over the third portion of the slot 320-b.

The other UE 315 that received the sidelink request 325 over the slot 320-b may determine that no data transmission is scheduled based on not receiving the sidelink confirmation 340 over the third portion of the slot 320-b. Any of the UEs 315 that have successfully scheduled a data transmission (for example, the UE 315-a) may perform the data transmission using claimed data resources from the shared data resource pool 310-a. Over control resources 305-b, the UEs 315 may claim data resources from the shared data resource pool 310-*b* according to the priority schedule, as described herein.

A UE 315 may determine, based on one or more beam training procedures, which one or more beams to use to communicate with other UEs 315. For instance, if a UE 315 is not scheduled to receive any data transmissions, then it may monitor, over a respective control block, for a sidelink request 325 by training its receive beam on the UE 315 that is scheduled to transmit a sidelink request 325, for example, according to the priority schedule. That is, the UE 315-*b* and the UE 315-*c* may both direct their receive beams to receive a sidelink request 325 from the UE 315-*a*, for example, according to a previously performed beam training procedure. The UE 315-*b* and the UE 315-*c* may thus determine, by receiving the sidelink request 325 over the slot 320-*a*, whether each is the target UE 315.

If a UE 315 is already scheduled to receive a data transmission on a receive beam, then it may monitor for sidelink request messages 325 using that receive beam. For example, if the UE 315-*a* schedules UE 315-*c* over the slot 320-*a* for a data transmission on a first receive beam, then the UE 315-*c* may monitor for subsequent sidelink request messages 325 over control resources 305-*a* on the first receive beam. By monitoring for sidelink request messages 325 using the first receive beam, the UE 315-*c* may determine whether potential subsequently schedulable data transmissions will interfere with the previously scheduled data transmission using the first receive beam. The UE 315-*c* may determine whether to transmit a negative sidelink response 335 based on monitoring for sidelink requests 325 on the first receive beam, among other actions.

In some examples, the resource allocation scheme 300 may support FDM techniques for control signaling over the control resources 305 to realize more efficient communications as described herein. For example, the UEs 315-*a*, 315-*b*, and 315-*c* may represent UEs 315 of a first group and the control resources 305-*a* and 305-*b* may be located in a first frequency band that corresponds to the first group. In other words, the resource allocation scheme 300 may illustrate examples of operations in a first frequency band for a first group of UEs 315. In some examples, a wireless device (such as a base station 205 or a group leader UE 315, among other examples of wireless devices) may assign the UEs 315 to the first group. The UEs 315 may communicate sidelink control signals (for example, a sidelink request 325, a positive sidelink response 330, a negative sidelink response 335, or a sidelink confirmation message 340) over corresponding slots 320 assigned to the respective UEs 315 of the first group in the first frequency band of the control resources 305. In some examples, the group, the control blocks, or both, may be allocated based on priorities associated with the UEs 315. For example, the UEs 315 of the first group may be allocated a higher frequency band based on a relatively higher priority schedule of the UEs 315. In some examples, a UE 315 may be allocated a control block occurring earlier in the control resources 305 based on a priority of the UE 315 in the group (such as a priority schedule described herein). For example, in the control resources 305-*a*, the UE 315-*a* may have a relatively higher priority and be assigned to the slot 320-*a* based on the higher priority.

In some examples, the groups of UEs 315 may be re-assigned. For example, the UEs 315 may be assigned different control blocks, such as UE 315-*b* being allocated the slot 320-*d* in the control resources 305-*b* rather than the slot 320-*b* in the control resources 305-*a*. Additionally or alternatively, one or more of the UEs 315 may be assigned to a different group. For example, the UE 315-*a* may have communications for a UE 315-*d* (not shown) and may request to be grouped with the UE 315-*d*. The wireless device that determines the groupings may assign the UE 315-*d* to the group (such as in a slot 320 of the control resources 305-*b* of the first frequency band) or the wireless device may assign the UE 315-*a* to another group including the UE 315-*d*. In some examples, such re-assigning of the groups of UEs 315 may be performed relatively frequently in order to provide for reliable communications between the UEs 315 in a sidelink communications system.

Figure 4:
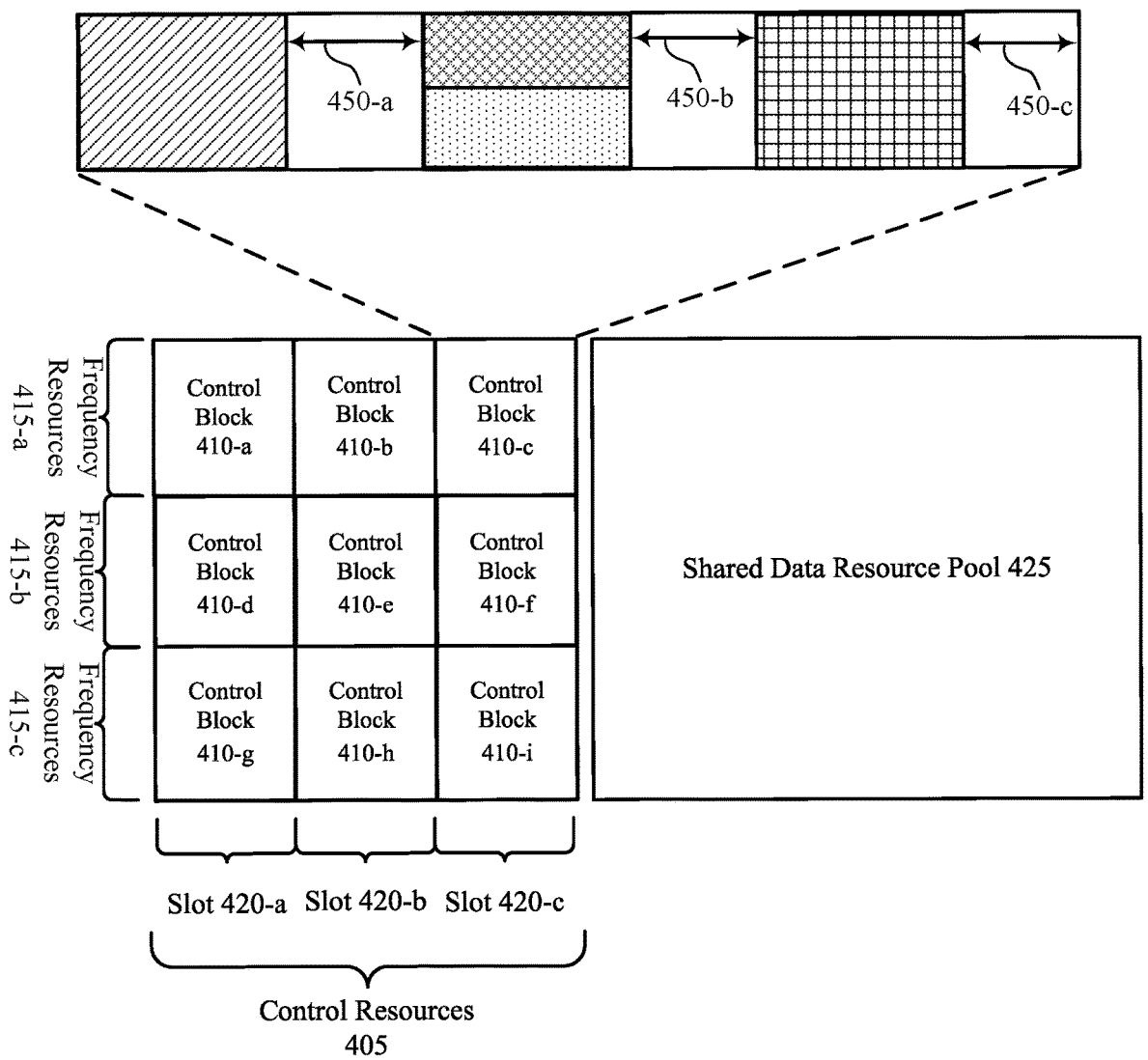
FIG. 4 illustrates an example of a resource allocation scheme that supports control signaling techniques for sidelink communications in accordance with aspects of the present disclosure.

FIG. 4 illustrates an example of a resource allocation scheme 400 that supports control signaling techniques for sidelink communications in accordance with aspects of the present disclosure. In some examples, the resource allocation scheme 400 may be implemented by aspects of wireless communications systems 100 or 200 or the resource allocation scheme 300. For example, the control resources 405 and the shared data resource pool 425 may be examples of aspects of the control resources 305 and the shared data resource pool 310 described with reference to FIG. 3. Additionally or alternatively, various UEs (such as UEs 315) may communicate using control signaling as described with reference to FIG. 3. For example, the sidelink request 430, the positive sidelink response 435, the negative sidelink response 440, and the confirmation indication message 445 may be examples of the sidelink request 325, the positive sidelink response 330, the negative sidelink response 335, and the sidelink confirmation message 340, respectively, described with reference to FIG. 3. Generally, the resource allocation scheme 400 may illustrate an example of multiplexing control signaling, such as FDM control signaling and TDM control signaling, as described herein in order to realize increased system efficiency.

The control resources 405 may include control blocks 410. The control blocks 410 may be allocated to UEs in a wireless communications system, which may enable the UEs to reserve resources of the shared data resource pool 425. For example, a control block 410 may be an example of a control block as described with reference to FIG. 3. The control blocks 410 may correspond to one or more frequency resources 415 (for example, frequency resources 415-*a* in a first frequency band) in order to increase the amount of resource utilization and system efficiency by enabling multiple UEs to perform control signaling on a same slot 420. In some examples, each UE in the system may be allocated a respective control block 410 to coordinate resource reservations and data transmissions related to the shared data resource pool 425.

For example, a first UE allocated to the control block 410-*a* may send or receive control information on the slot 420-*a* over the frequency resources 415-*a* concurrently with a second UE allocated to the control block 410-*d* sending or receiving control information on the slot 420-*a* over the frequency resources 415-*b*. In some examples, each control block 410 may be associated with a transmission time interval duration. For example, the control block 410-*c* may include a slot for the sidelink request 430, a slot for the positive sidelink response 435 and the negative sidelink response 440, and a slot for the confirmation indication message 445. The control block 410-*c* may also include one or more gaps 450 (for example, the gap 450-*b* may represent a slot provided to enable a UE to accurately decode positive and negative sidelink responses, among other examples).

The UEs may be assigned to one or more groups corresponding to the frequency resources 415. For example, a set of UEs may be assigned to a first group corresponding to the frequency resources 415-*c* by another wireless device (for example, a base station 105 or another UE such as a group leader UE). The wireless device may configure the set of UEs with the first group by indicating a group identifier (for example, as part of a downlink configuration message). Additionally or alternatively, the wireless device may indicate frequency resources 415 corresponding to the first group and the UEs in the first group may be configured to determine the assignment based on the frequency or based on other communications with other UEs in the first group, among other factors. In some examples, the first group may perform one or more beam training procedures as described with reference to FIG. 3. For example, a UE may be allocated a control block 410-*g* in the frequency resources 415-*c* and may train one or more transmission beams or reception beams for communications with other UEs that have corresponding allocated control blocks 410 in the frequency resources 415-*c*. In other words, UEs in the first group may transmit sidelink requests 430 to other UEs in the first group in order to utilize the shared data resource pool 425 for communications between UEs in the first group. In some examples, a UE may be assigned to one or more groups based on one or more capabilities of the UE. For example, a UE may have the capability to utilize only a single receive beam or transmit beam at a given time, and may be assigned to a single group. In some other examples, the UE may be able to use multiple receive beams or transmit beams at the same time and may be assigned to more than one group. For example, the UE may monitor for transmissions (such as sidelink requests) across multiple frequency resources 415 (in other words, multiple frequency bands), or the UE may send transmissions across multiple frequency resources 415 (such as sidelink responses), among other examples of communications across multiple groups.

A set of UEs may be assigned to a group corresponding to a frequency resources 415 based on one or more factors. For example, the set of UEs may be assigned to a group based on a priority associated with one or more of the UEs in the group. In some examples, a group corresponding to the frequency resources 415-*a* may be associated with a higher priority than a group corresponding to the frequency resources 415-*b* based on the frequency resources 415-*a* being relatively higher in frequency than the frequency resources 415-*b*. For example, a UE allocated to the control block 410-*a* may have a higher priority than a UE allocated to the control block 410-*d*, in some examples, in accordance with a priority schedule determined by the UE (for example, based on an indication from a base station or autonomously determined by the UE). Additionally or alternatively, the UEs within a group may be allocated a control block 410 based on a relative priority of the UEs within the group. For example, a UE in the group corresponding to the frequency resources 415-*a* may be allocated the control block 410-*a* occurring earlier in the control resources 405 if the UE has a higher priority than another UE in the group allocated to the control block 410-*b* occurring later in the control resources 405 (for example, in accordance with a priority schedule indicated by the base station or determined by the UE in the group of UEs). In some examples, the set of UEs may be assigned to a group based on locations of the set of UEs. For example, a wireless device may group the set of UEs based on a proximities of the set of UEs with one another (for example, the UEs in a group of UEs may be relatively near each other in a geographic area and relatively likely to have communications with each other). In some examples, the wireless device that assigns the UEs to groups may indicate a regrouping of some or all of the UEs. In such examples, the UEs may maintain their groups until receiving the indication.

In some examples, the control resources 405 may be divided into one or more frequency resources 415 and the shared data resource pool may also be divided into one or more frequency resources 415. For example, a group of UEs assigned to the frequency resources 415-*a* may attempt to reserve resources of the shared data resource pool 425 in the frequency resources 415-*a*. In some other examples, the shared data resource pool 425 is not divided into the frequency resources 415. For example, a UE allocated to the control block 410-*g* and a UE allocated to the control block 410-*d* may attempt to reserve or utilize any of (or all of) the data resources in the shared data resource pool 425 (for example, across the frequency resources 415). In some examples, two UEs in different groups may attempt to reserve the same resources in the shared resource pool 425. In some such examples, the two UEs may communicate using the same resources based on an interference measurement satisfying a threshold (for example, the interference measurement being below a threshold). In some other examples, the UE of the two UEs allocated to a control block 410 at a higher frequency may have a higher priority and may successfully reserve the resources of the shared resource pool 425 as described herein.

Figure 5:
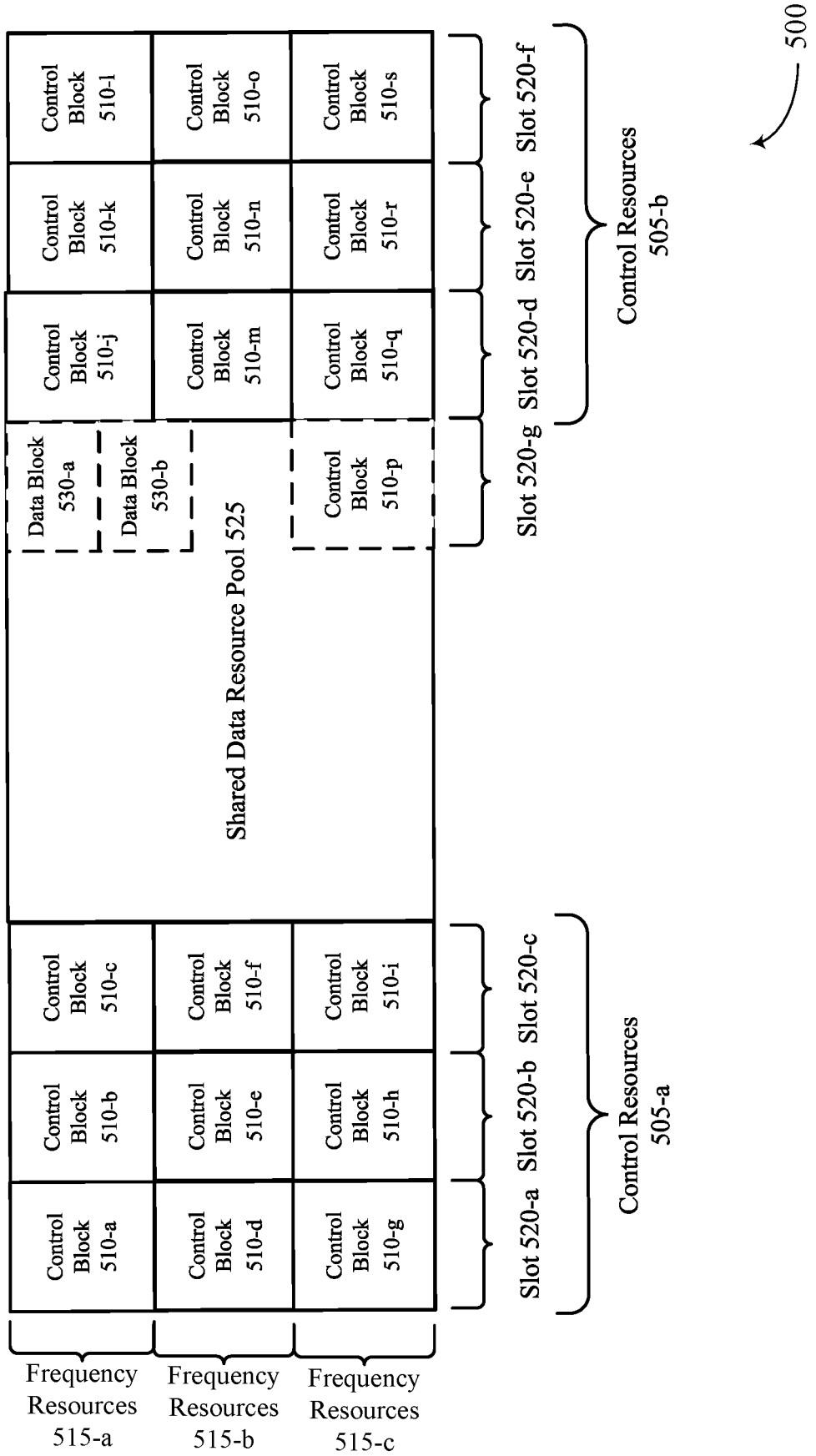
FIG. 5 illustrates an example of a resource allocation scheme that supports control signaling techniques for sidelink communications in accordance with aspects of the present disclosure.

FIG. 5 illustrates an example of a resource allocation scheme 500 that supports control signaling techniques for sidelink communications in accordance with aspects of the present disclosure. In some examples, the resource allocation scheme 400 may be implemented by aspects of wireless communications systems 100 or 200 or the resource allocation scheme 300 or 400. For example, the control resources 505 and the shared data resource pool 525 may be examples of aspects of the control resources 305 or 405 and the shared data resource pools 310 and 425 described with reference to FIGS. 3 and 4, respectively.

In the example shown, the resource allocation scheme 500 may be associated with control resources 505-*a* and control resources 505-*b*. The control resources 505 may include control blocks 510. The control blocks 510 may be examples of the control blocks 410 described with reference to FIG. 4. For example, one or more of the control blocks 510 may be allocated to UEs in a wireless communications system, which may enable the UEs to reserve resources of the shared data resource pool 525. The UEs may be allocated to the control blocks 510 in various frequency resources 515 based on one or more groups. For example, a UE may be assigned to a first group corresponding to the frequency resources 515-*a* and the UE may be allocated one or more control blocks 510-*a*, 510-*b*, or 510-*c*, for example, based on a priority associated with the UE. In other words, the first group of UEs may be allocated control blocks 510 that are included in a first frequency band illustrated by the frequency resources 515-*a*. The UEs in the first group may attempt to transmit and monitor for control signals to and from other UEs in the first group, among others, in order to utilize the shared data resource pool 525 for subsequent communications between UEs in the first group.

In some examples, the different groups of UEs corresponding to the various frequency resources 515 may be updated (in other words, a configuring device such as a base station or a group leader UE may update, for example, reassign or shuffle the groups of UEs). For example, a first UE allocated to the control block 510-*a* may have one or more communications for a second UE allocated to the control block 510-d. In some examples, the first UE may be unable to reserve resources of the shared data resource pool 525 to send the communications to the second UE because the control block 510-a and the control block 510-d occur on the same slot 520-a. In such examples, the first UE may indicate a request for a general updating of the UE grouping, or more specifically, to be grouped with the second UE in the control resources 505-b in order to transmit a sidelink request to the second UE as the target UE. A wireless device, such as a base station 105, may update the groups such that the first UE and the second UE may be assigned to the same group based on the indication. For example, the first UE may be allocated a control block 510-q and the second UE may be allocated a control block 510-r in the frequency resources 515-c, which may enable the first UE to reserve resources for communications with the second UE. Such updating of the groups may, in some examples, also be based on changes in UE movement or location, network operating parameters, priorities of UEs in different groups, priorities of UEs in a same group, among other factors, or any combination thereof. Additionally or alternatively, the wireless device may update the groups of UEs relatively frequently, for example, to enable UEs in different groups to communicate with each other, which may result in reliable sidelink communications while maintaining relatively high utilization of the control resources 505.

In some examples, the groups of UEs may have different sizes. The resource allocation scheme 500 may illustrate such an example where a first group of UEs associated with the frequency resources 515-c may have a different quantity of UEs and corresponding control blocks 510 than a second group of UEs associated with the frequency resources 515-b. For example, the first group may include four control blocks 510-p, 510-q, 510-r, and 510-s that may be allocated to four UEs in the first group while the second group may include three control blocks 510-m, 510-n, and 510-o that may be allocated to three UEs in the second group, although such quantities are provided as an illustrative example and it is to be understood that the groups may comprise any number of UEs, control blocks 510, or any combination thereof.

In some examples, the control blocks of the first group and the control blocks of the second group may be aligned in time (for example, the last control block 510-s of the first group and the last control block 510-o of the second group may occur on the same slot 520-f). In such examples, the control block 510-p may occur at the slot 520-g such that control signaling by the UE allocated to the control block 510-p may be communicated concurrently with one or more data transmissions using the shared data resource pool 525. For example, one or more other UEs in the system may have reserved a data block 530-a, a data block 530-b, or both that occur on the slot 520-g. The one or more other UEs may communicate data over the data blocks 530 in the slot 520-g concurrently with the UE allocated to the control block 510-p communicating control signals. In some examples, the UE allocated to the control block 510-p may have a highest priority in the group of UEs, for example, because the UE allocated earlier control block has higher priority than the UE's allocated later control blocks. In some other examples, the first control block 510-q of the first group and the first control block 510-m of the second group may occur on the same slot 520-d, and the control block 510-p may occur after the slot 520-f.

Figure 6:
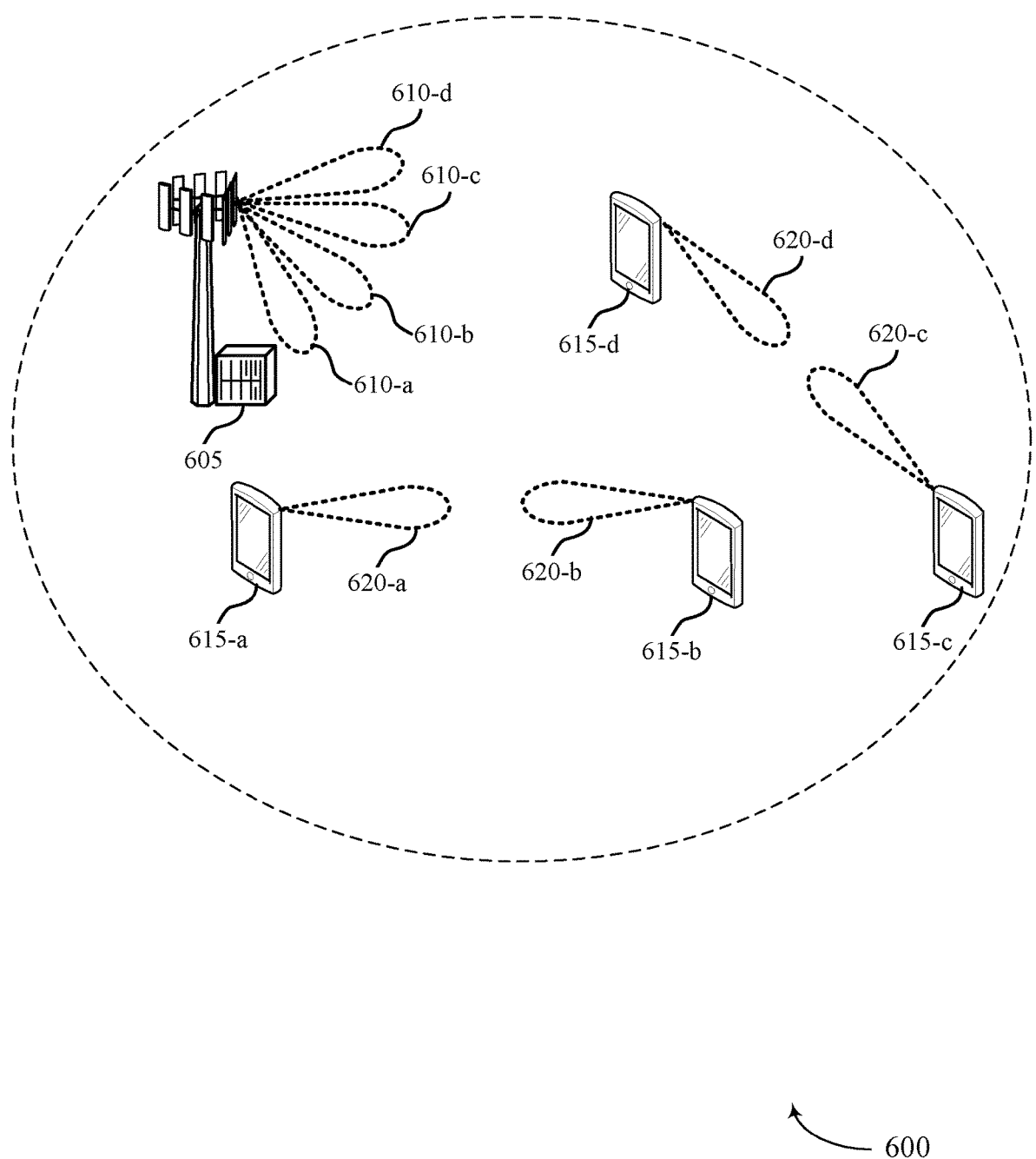
FIG. 6 illustrates an example of a wireless communications system that supports control signaling techniques for sidelink communications in accordance with aspects of the present disclosure.

FIG. 6 illustrates an example of a wireless communications system 600 that supports control signaling techniques for sidelink communications in accordance with aspects of the present disclosure. In some examples, wireless communications system 600 may implement aspects of wireless communications systems 100 or 200. The wireless communications system 600 may be associated with an example scenario of communications in accordance with aspects of one or more resource allocations schemes as described herein (for example, resource allocation schemes 300, 400, or 500).

A base station 605 may communicate with one or more of the UEs 615, for example, by transmitting downlink signals on one or more beams 610. For example, the base station 605 may communicate with the UE 615-a on the beam 610-a, may communicate with the UE 615-b on the beam 610-b, may communicate with the UE 615-c on the beam 610-c, and may communicate with the UE 615-d on the beam 610-d. In some examples, the base station 605 may allocate shared resources for sidelink communications among the UEs 615. The shared resources may include control resources, including multiple control blocks, and data resources, as described with reference to FIG. 3. The UEs 615 may identify a priority schedule that may indicate relative priorities of one or more UEs 615 (for example, the priority schedule may indicate which UE 615 may attempt to claim the data resources by transmitting sidelink requests over each control block of the control resources). The base station 605 may transmit the priority schedule to the UEs 615, or the UEs 615 may determine the priority schedule autonomously or based on a preconfigured priority schedule, among other examples, as described with reference to FIG. 3. The UEs 615 may perform one or more beam training procedures, to identify which beams 620 to use for communicating with each other. For instance, the UE 615-b may determine which beam 620 to use to communicate with one or more UEs 615 that are assigned to a same group as the UE 615-b. For example, to communicate with the UE 615-a in the same group as the UE 615-b, the UE 615-b may use the beam 620-b to receive sidelink transmissions from the UE 615-a or transmit sidelink communications to the UE 615-a. Additionally or alternatively, the UE 615-d may be assigned to a same group as the UE 615-c and may communicate with the UE 615-c using the beam 620-d. In some examples, the UEs 615 in the wireless communications system 600 may determine which other UEs 615 to communicate with based on the grouping of the UEs 615 (for example, UEs 615 in a first group may monitor for or transmit communications with other UEs 615 in the first group). Such communications may be transmitted or received via the beams 620 over a frequency band that corresponds to a respective group.

In some examples, the UEs 615 may use or direct their beams 620 based on a priority schedule, or previously scheduled transmissions, or both. For instance, the UEs 615 may determine, according to a priority schedule, that the UE 615-a is scheduled to attempt to claim the data resources by transmitting a sidelink request over a control block (for example, over a slot in the control resources). Based on the priority schedule, the UE 615-b may use the beam 620-b trained on the UE 615-a, to determine whether it is the target UE 615 of the UE 615-a. The UE 615-c may be scheduled to receive another data transmission from the UE 615-d on the beam 620-c. That is, on a previous slot, the UE 615-d may have transmitted a sidelink request on the beam 620-d for reserving half of the data resources. The UE 615-c may have received the sidelink request and may have transmitted a positive sidelink response to the UE 615-d on the beam 620-c indicating that all of the data resource are available for transmission to the UE 615-c on beam 620-c. The UE 615-d may have transmitted a sidelink confirmation to the UE 615-c on the beam 620-d reserving the first half of the data resources. Thus, over the current slot, the UE 615-*c* may maintain beam 620-*c* directed towards the UE 615-*d* and may monitor for a sidelink request (for example, from the UE 615-*a*) on the beam 620-*c*.

The UE 615-*b* may receive, on a first portion of the slot, the sidelink request to reserve a set of the data resources from the UE 615-*a* and may determine that it is available for a data transmission over the set of data resources. For example, the sidelink request may indicate half of the data resources for reservation, and the UE 615-*b* may determine that it is available for the entirety of the data resources to receive a data transmission on beam 620-*b*. In such examples, on a second portion of the slot, the UE 615-*b* may transmit a positive sidelink response to the UE 615-*a* on the beam 620-*b*. The positive sidelink response may indicate the entirety of the data resources as available for a data transmission. Then, the UE 615-*b* may continue to monitor, over a third portion of the slot on the beam 620-*b*, for a sidelink confirmation indicating a reservation of the set of the data resources.

The UE 615-*c* may determine whether a potential transmission from the UE 615-*a* on the beam 620-*a* to the UE 615-*b* will cause interference above a threshold on the beam 620-*c* with the data transmission previously scheduled by UE 615-*d*. That is, the UE 615-*c* may monitor for the sidelink request from the UE 615-*a* using beam 620-*c*, and may perform one or more measurements to determine a level of interference on the beam 620-*c*. If the UE 615-*a* successfully reserves the set of the data resources for a data transmission to the UE 615-*b* using beam 620-*a*, then the UE 615-*a* will transmit the scheduled data transmission to the UE 615-*b* using the same beam 620-*a*. Thus, if the sidelink request on the beam 620-*a* is received at the UE 615-*c* on the beam 620-*c* with a signal power that is above a threshold (for example, indicating that a level of interference on the beam 620-*c* is above a threshold), then a potential data transmission from the UE 615-*a* to the UE 615-*b* on the beam 620-*a* may also cause interference above a threshold for the UE 615-*c* on the beam 620-*c* while the UE 615-*c* is receiving a data transmission from the UE 615-*d*. However, the UE 615-*d* may have previously scheduled a data transmission on the first half of the data resources. Because the previously scheduled data transmission may have a higher priority (for example, according to the priority scheduled), the UE 615-*c* may object to the data transmission from the UE 615-*a* to the UE 615-*b* if it will interfere with the previously scheduled data transmission from the UE 615-*d*.

If the measured interference level is above the threshold, then the UE 615-*c* may determine that a data transmission from the UE 615-*a* on the beam 620-*a* might interfere with the previously scheduled data transmission from the UE 615-*d* to a sufficient degree (for example, the interference level will degrade the previously scheduled data transmission). That is, a data transmission from the UE 615-*a* to the UE 615-*b* on the first half of the data resources may conflict with the previously scheduled data transmission on the same portion of the data resources from the UE 615-*d* to the UE 615-*c*. In such examples, the UE 615-*c* may transmit a negative sidelink response to the UE 615-*a*. The negative sidelink response may indicate that a specific set of the data resources (for example, the first half of the data resources) are not available for a data transmission from the UE 615-*a* to the UE 615-*b*. Such a negative sidelink response may result in the UE 615-*a* refraining from using the first half of the data resources for a data transmission to the UE 615-*b*. In some examples, the UE 615-*c* may transmit the negative sidelink response to the UE 615-*a* on the beam 620-*c*. In some other examples, the UE 615-*c* may transmit the negative sidelink response on another beam 620 (for example, a beam that is directed toward the UE 615-*a* to increase the likelihood that the UE 615-*a* will receive the negative sidelink response).

The UE 615-*a* may determine whether to transmit the data transmission to the UE 615-*b* based on monitoring for sidelink responses from other UEs 615. For example, the UE 615-*a* may monitor for the sidelink responses from the other UEs 615 over a second portion of the slot. The UE 615-*a* may receive, on the beam 620-*a* from the UE 615-*b*, a positive sidelink response indicating that the UE 615-*b* is available and able to receive the data transmission on the beam 620-*b* (for example, on any or all of the data resources). If the UE 615-*c* determines, as described herein, that the data transmission will not interfere with the previously scheduled data transmission from the UE 615-*d* on the beam 620-*c* above a threshold, the UE 615-*c* may refrain from transmitting a negative sidelink response. In such examples, the UE 615-*a* may transmit, on the beam 620-*a*, a sidelink confirmation indicating reservation of the set of data resources. For example, if the UE 615-*a* does not receive negative sidelink responses from any of the other UEs 615, the UE 615-*a* may transmit a sidelink confirmation indicating reservation of any of the data resources (for example, a first half of the data resources, a second half of the data resources, a middle portion including half of the data resources, or a non-consecutive set of resources totaling half of the data resources). Subsequently, the UE 615-*a* may transmit, to the UE 615-*b* on the beam 620-*a*, the data transmission over the set of the data resources. Similarly, and in some examples concurrently, the UE 615-*d* may transmit the previously scheduled data transmission to the UE 615-*c* on the beam 620-*d* over a partially or completely overlapping set of the data resources. Because the UE 615-*c* determined that such overlapping data transmissions would not cause interference above a threshold, the UE 615-*b* and the UE 615-*c* may successfully receive the overlapping data transmissions, resulting in increased usage of the available data resources and increased system efficiency.

If the UE 615-*c* determines, as described herein, that a data transmission from the UE 615-*a* to the UE 615-*b* will interfere with the previously scheduled data transmission from the UE 615-*d* on the beam 620-*c* on the first half of the data resources, then the UE 615-*c* may transmit a negative sidelink response (for example, on the beam 620-*c*). The negative sidelink response may indicate that the first half of the data resources are unavailable for a data transmission on beam 620-*a*. In such examples, the sidelink confirmation may indicate a set of data resources that does not conflict with the previously scheduled data transmission. For instance, the sidelink confirmation may indicate a reservation of the second half of the data resources that does not conflict with the first half of the data resources that are unavailable for UE 615-*a*. The UE 615-*d* may transmit the previously scheduled data transmission on beam 620-*d* on the first half of the data resources, and the UE 615-*a* may transmit a data transmission on beam 620-*a* on the second half of the data resources. The UE 615-*b* and the UE 615-*c* may successfully receive their respective data transmissions on the respective portions of the data resources without interfering with each other, resulting in an efficient use of the data resources while decreasing interference and the likelihood of failed transmissions.

In some examples, a target UE 615 and a non-target UE 615 may be previously scheduled to transmit or receive data communications over the data resources. In such examples, a target UE 615 may specify available resources in a positive sidelink response it transmits in response to a sidelink request from another UE 615, and a non-target UE 615 may specify unavailable resources in a negative sidelink response it transmits in response to the sidelink request from the other UE 615. For instance, the UE 615-*c* may be previously scheduled by the UE 615-*d* to receive a data transmission on the second half of the data resources. Similarly, the UE 615-*b* may be previously scheduled to send or receive a data transmission (for example, with another UE 615). In such examples, the UE 615-*a* may transmit a sidelink request indicating a reservation of half of the data resources. The UE 615-*b* may transmit a positive sidelink response indicating that it is available for a data transmission on the first half of the data resources. The UE 615-*a* may determine from the positive sidelink request that the UE 615-*b* is not available for a data transmission on the second half of the data resources. The UE 615-*c* may transmit a negative sidelink response indicating that the second half of the data resources are not available for a data transmission. The UE 615-*a* may determine, from the negative sidelink response, that the second half of the data resources are not available for a data transmission on beam 620-*a*. In such examples, the availability of the UE 615-*b* does not conflict with the transmission schedule for the UE 615-*c* (for example, the UE 615-*b* is available for a data transmission on the first half of the data resources while the UE 615-*c* has indicated that the second half of the data resources are unavailable based on a previously scheduled transmission). In such examples, the UE 615-*a* may transmit a sidelink confirmation reserving the first half of the data resources for a data transmission to the UE 615-*b* on beam 620-*a*.

In some examples, the availability of a target UE 615 may not align with previously scheduled data transmissions for a non-target UE 615. In such examples, the non-target UE 615 may block the requested data transmission. For example, if the UE 615-*b* is available for a data transmission on the first half of the data resources and unavailable for a data transmission on the second half of the data resources, and the UE 615-*c* has been previously scheduled to receive a data transmission over the first half of the data resources, then the UE 615-*c* may transmit a negative sidelink response indicating that the first half of the data resources are unavailable for a data transmission. Upon determining that the availability of the UE 615-*b* overlaps partially or completely with a previously scheduled data transmission for the UE 615-*c* (for example, based on the negative sidelink response), the UE 615-*a* may refrain from transmitting a sidelink confirmation and may refrain from transmitting using the data resources for a given duration (for example, one or more slots).

Figure 7:
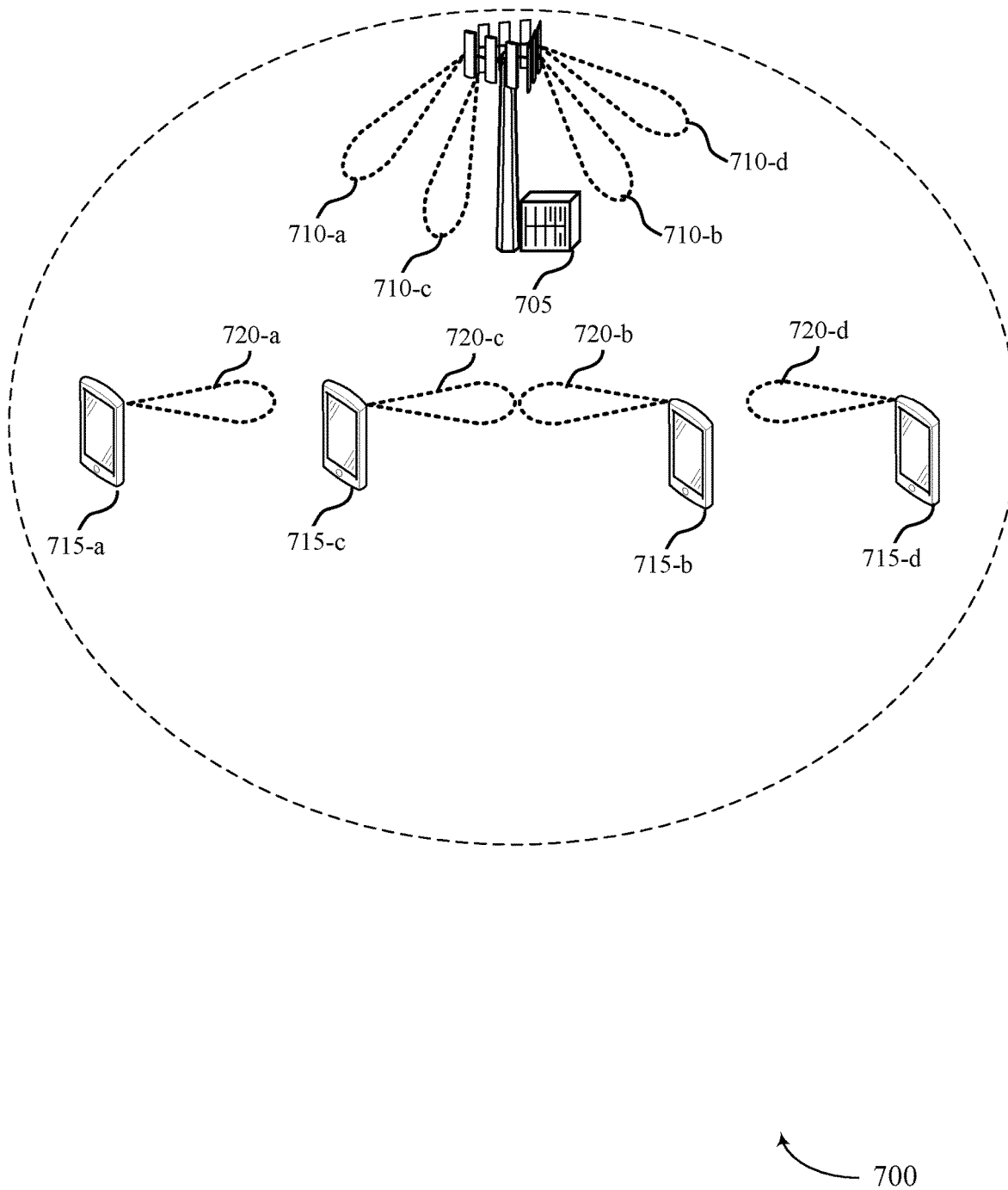
FIG. 7 illustrates an example of a wireless communications system that supports control signaling techniques for sidelink communications in accordance with aspects of the present disclosure.

FIG. 7 illustrates an example of a wireless communications system 700 that supports control signaling techniques for sidelink communications in accordance with aspects of the present disclosure. In some examples, wireless communications system 700 may implement aspects of wireless communications systems 100, 200, or 600. The wireless communications system 700 may be associated with an example scenario of communications in accordance with aspects of one or more resource allocations schemes as described herein (for example, resource allocation schemes 300, 400, or 500).

A base station 705 may communicate with one or more UEs 715. The base station 705 may transmit downlink signals to the UEs 715 on beams 710. For example, the base station 705 may communicate with the UE 715-*a* on the beam 710-*a*, may communicate with the UE 715-*b* on the beam 710-*b*, may communicate with the UE 715-*c* on the beam 710-*c*, and may communicate with the UE 715-*d* on the beam 710-*d*. In some examples, the base station 705 may allocate shared resources for sidelink communications among the UEs 715. The shared resources may include control resources, including multiple control blocks, and data resources, as described with reference to FIG. 3. The UEs 715 may identify a priority schedule that indicates which UE 715 may attempt to claim the data resources over each control block of the control resources. The base station 705 may transmit the priority schedule to the UEs 715 or the UEs 715 may determine the priority scheduled autonomously or based on a preconfigured priority schedule, among other examples, as described with reference to FIG. 3. At least some, if not all, of the UEs 715 may perform one or more beam training procedures, to identify which beams 720 to use for communicating with each other.

For instance, the UE 715-*b* may determine which beam 720 to use to communicate with one or more UEs 715 that are assigned to a same group as the UE 715-*b*. For example, to communicate with the UE 715-*d* in the same group as the UE 715-*b*, the UE 715-*b* may use the beam 720-*b* to receive sidelink transmissions from the UE 715-*d* or transmit sidelink communications to the UE 715-*d*. Additionally or alternatively, the UE 715-*a* may be assigned to a same group as the UE 715-*c* and may communicate with the UE 715-*c* using the beam 720-*a*. In some examples, the UEs 715 in the wireless communications system 700 may determine which other UEs 715 to communicate with based on the grouping of the UEs 715 (for example, UEs 715 in a first group may monitor for or transmit communications with other UEs 715 in the first group). Such communications may be transmitted or received via the beams 720 over a frequency band that corresponds to a respective group.

In some examples, the UEs 715 may use their beams 720 based on a priority schedule, or previously scheduled transmissions, or both, that may be related to the groupings of the UEs. For instance, the UEs 715 may determine, according to a priority schedule, that the UE 715-*a* is scheduled to attempt to claim the data resources over a control block (for example, over a slot in the control resources) based on one or more of the UEs 715 being assigned to one or more groups as described herein. For example, the priority schedule may indicate that UEs 715 in a higher frequency band have a higher priority for reserving resources and UEs 715 in a lower frequency band may concede the resources based on the priority schedule (for example, the UE 715-*b* may be a target UE and refrain from transmitting a positive sidelink response, or may be a non-target UE of a higher priority group that is aware of a higher priority reservation and may transmit a negative sidelink response, among other examples). Such a priority schedule may enable the UEs 715 to avoid transmissions on the same data resources between UEs of different groups, for example, if the transmissions may result in a relatively high amount of interference.

Based on the priority schedule, the UE 715-*b* may use the beam 720-*b* to determine whether it is the target UE 715 of the UE 715-*a*. The UE 715-*d* may be scheduled to receive another data transmission from the UE 715-*c* on the beam 720-*c*. That is, over a previous slot, the UE 715-*c* may have transmitted a sidelink request on the beam 720-*c*, the UE 715-*d* may have received the sidelink request and may have transmitted a positive sidelink response to the UE 715-*c* on the beam 720-*c*, and the UE 715-*c* may have transmitted a sidelink confirmation to the UE 715-*d* on the beam 720-*c*. Thus, over the current slot, the UE 715-*d* may maintain beam 720-*d* trained on the UE 715-*c* and may monitor for a sidelink request (for example, from the UE 715-*a*) on the beam 720-*d*. In some examples, the UE 715-*b* may also receive the sidelink confirmation from the UE 715-*c* on the beam 720-*b* at a high receive power, and may determine that the UE 715-*c* has successfully reserved a subset of the data resources for a data transmission to be transmitted on the beam 720-*c*.

The UE 715-*a* may transmit a sidelink request to the UE 715-*b* on the beam 720-*a*. The UE 715-*b* may monitor for and receive the sidelink request over a first portion of the slot on the beam 720-*b*. The UE 715-*b* may determine, based on the sidelink request, that it is the target UE 715 for the UE 715-*a*. But the UE 715-*b* may also determine, based on the sidelink confirmation previously received from the UE 715-*c*, that a data transmission from the UE 715-*c* will cause a high level of interference on the beam 720-*b* with a data transmission from the UE 715-*a* on the beam 720-*b*. For example, the UE 715-*b* may perform interference level measurements (for example, determine a receive power, a transmission power, a SNR, a SINR, among other examples, on both the sidelink confirmation received from the UE 715-*c* and the sidelink request received from the UE 715-*a* on the beam 720-*b*.

In some examples, the UE 715-*b* may compare the measured interference levels for the UE 715-*a* and the UE 715-*c*, and may determine based on the measurements that a data transmission from the UE 715-*a* will experience a high level of interference on the beam 720-*b* from the data transmission from the UE 715-*c* on the beam 720-*b*. In such examples, even though the UE 715-*b* is available for a data transmission from the UE 715-*a* (for example, is not scheduled for a data transmissions), the UE 715-*b* may refrain from transmitting a positive sidelink response over the second portion of the slot. In some examples, the UE 715-*d* may also receive the sidelink request from the UE 715-*a* on the beam 720-*d*. Because the UE 715-*d* is already scheduled to receive a data transmission from the UE 715-*c* on the beam 720-*d*, the UE 715-*d* may transmit a negative sidelink response to the UE 715-*a*.

In some examples, the UE 715-*a* may, based on monitoring for the sidelink responses, transmit the data transmission (for example, if the UE 715-*a* receives a positive sidelink response from the UE 715-*b* and does not receive a negative sidelink responses from another UE 715 over the second portion of the slot) or refrain from transmitting the data transmission (for example, if the UE 715-*a* does not receive a positive sidelink response from the UE 715-*b*, receives a negative sidelink response from another UE 715, or a combination thereof, over the second portion of the slot). For example, the UE 715-*a* may refrain from transmitting the data transmission and may refrain from transmitting a sidelink confirmation to the UE 715-*b* over a third portion of the slot. The UE 715-*b* may monitor for the sidelink confirmation, and upon not receiving it, may determine not to monitor for a data transmission over the subset of the sidelink resources.

Figure 8:
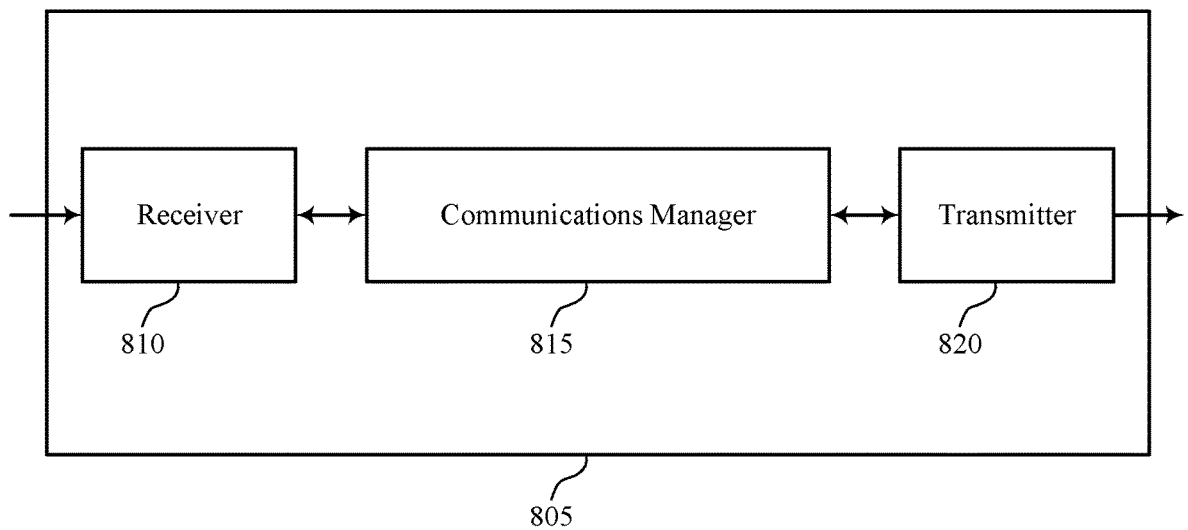
FIGS. 8 and 9 show block diagrams of devices that support control signaling techniques for sidelink communications in accordance with aspects of the present disclosure.

FIG. 8 shows a block diagram of a device 805 that supports control signaling techniques for sidelink communications in accordance with aspects of the present disclosure. The device 805 may be an example of aspects of a UE 115 as described herein. The device 805 may include a receiver 810, a communications manager 815, and a transmitter 820. The communications manager 815 can be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to control signaling techniques for sidelink communications, among other examples). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine shared resources for communicating over one or more sidelink communication links, the shared resources including control resources and data resources, determine a first set of the control resources in a first frequency band corresponding to a first group of UEs, the first group of UEs including the first UE, transmit, to a second UE in the first group of UEs on a transmission beam over a first control block of the first set of the control resources, a sidelink request to reserve a set of the data resources, where the first control block is allocated to the first UE, and monitor, by the first UE on a receive beam over the first set of the control resources, for one or more sidelink responses. The communications manager 815 may also determine shared resources for communicating over one or more sidelink communication links, the shared resources including control resources and data resources, determine a first set of the control resources in a first frequency band corresponding to a first group of UEs, the first group of UEs including the first UE and a second UE, monitor, on a receive beam over a first control block of the first set of the control resources, for a sidelink request from the second UE to reserve a set of the data resources, the first control block allocated to the second UE and the sidelink request indicating that the first UE is a target UE of the sidelink request, and determine, based on the monitoring, whether to transmit a sidelink response to the second UE on a transmission beam over the first set of the control resources, the sidelink response including a positive sidelink response to the sidelink request or a negative sidelink response to the sidelink request, the positive sidelink response indicating that the set of the data resources are available and the negative sidelink response indicating that the set of the data resources are unavailable. The communications manager 815 may also determine shared resources for communicating over one or more sidelink communication links, the shared resources including control resources and data resources, determine a first set of the control resources in a first frequency band corresponding to a first group of UEs, the first group of UEs including the first UE and a second UE, monitor, on a receive beam over the first set of the control resources in the first frequency band, for a first sidelink request from the second UE, receive, based on the monitoring, a second sidelink request from a third UE to reserve a set of the data resources, the second sidelink request indicating that a fourth UE is a target UE of the second sidelink request, a second group of UEs including the third UE and the fourth UE, and determine, based on receiving the second sidelink request, whether to transmit a sidelink response to the third UE, the sidelink response indicating a positive response to the second sidelink request to reserve the set of the data resources or a negative response to the second sidelink request to reserve the set of the data resources. The communications manager 815 may be an example of aspects of the communications manager 1110 described herein.

The communications manager 815, or its sub-components, may be implemented in hardware, code (for example, software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at different locations, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
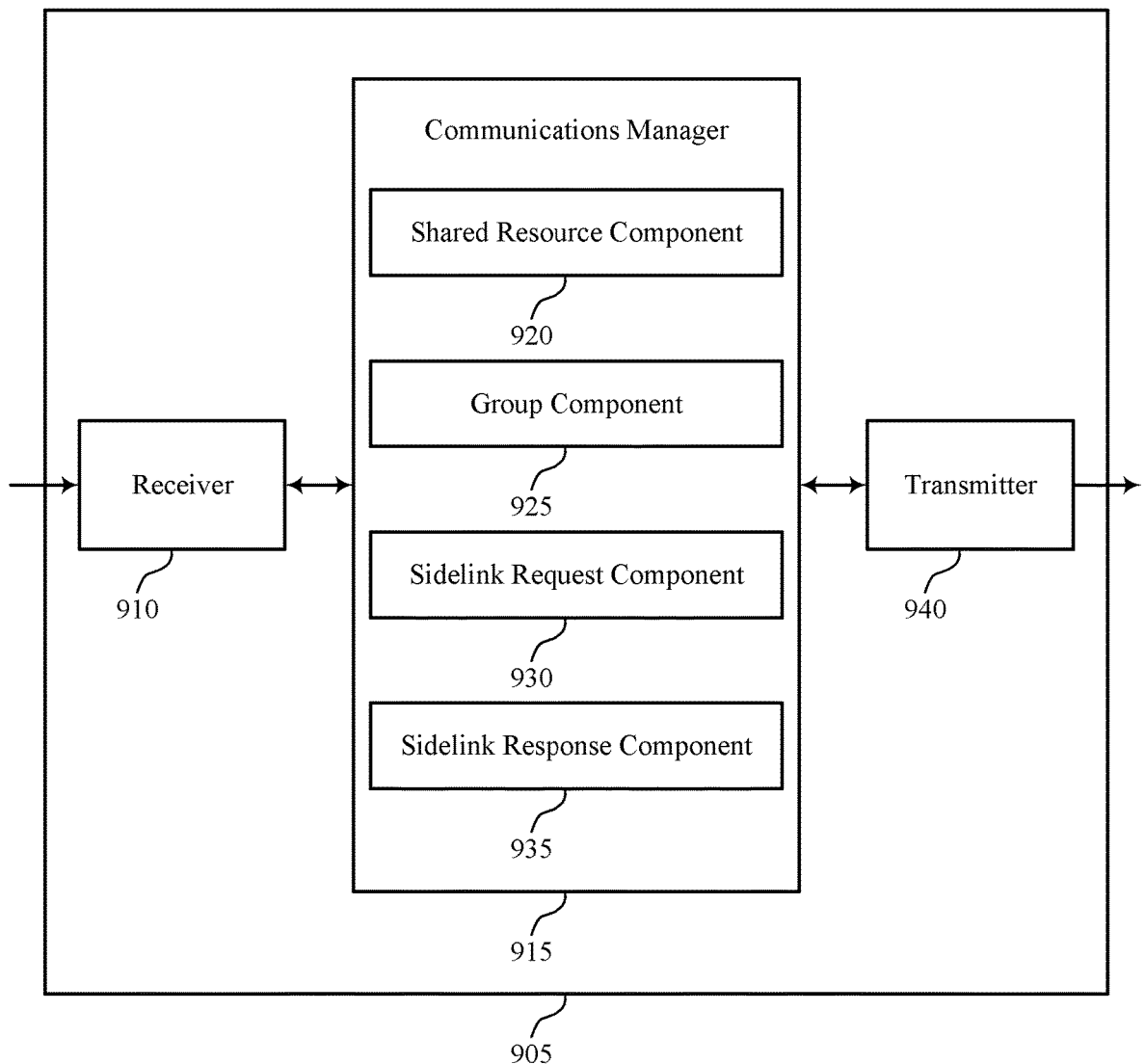

FIG. 9 shows a block diagram of a device 905 that supports control signaling techniques for sidelink communications in accordance with aspects of the present disclosure. The device 905 may be an example of aspects of a device 805, or a UE 115 as described herein. The device 905 may include a receiver 910, a communications manager 915, and a transmitter 940. The communications manager 915 can be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to control signaling techniques for sidelink communications, among other examples). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a shared resource component 920, a group component 925, a sidelink request component 930, and a sidelink response component 935. The communications manager 915 may be an example of aspects of the communications manager 1110 described herein.

The shared resource component 920 may determine shared resources for communicating over one or more sidelink communication links, the shared resources including control resources and data resources. In some examples, the shared resource component 920 may determine shared resources for communicating over one or more sidelink communication links, the shared resources including control resources and data resources. In some examples, the shared resource component 920 may determine shared resources for communicating over one or more sidelink communication links, the shared resources including control resources and data resources.

The group component 925 may determine a first set of the control resources in a first frequency band corresponding to a first group of UEs, the first group of UEs including the first UE. In some examples, the group component 925 may determine a first set of the control resources in a first frequency band corresponding to a first group of UEs, the first group of UEs including the first UE and a second UE. In some examples, the group component 925 may determine a first set of the control resources in a first frequency band corresponding to a first group of UEs, the first group of UEs including the first UE and a second UE.

The sidelink request component 930 may transmit, to a second UE in the first group of UEs on a transmission beam over a first control block of the first set of the control resources, a sidelink request to reserve a set of the data resources, where the first control block is allocated to the first UE. In some examples, the sidelink request component 930 may monitor, on a receive beam over a first control block of the first set of the control resources, for a sidelink request from the second UE to reserve a set of the data resources, the first control block allocated to the second UE and the sidelink request indicating that the first UE is a target UE of the sidelink request. In some examples, the sidelink request component 930 may monitor, on a receive beam over the first set of the control resources in the first frequency band, for a first sidelink request from the second UE and receive, based on the monitoring, a second sidelink request from a third UE to reserve a set of the data resources, the second sidelink request indicating that a fourth UE is a target UE of the second sidelink request, a second group of UEs including the third UE and the fourth UE.

The sidelink response component 935 may monitor, by the first UE on a receive beam over the first set of the control resources, for one or more sidelink responses. In some examples, the sidelink response component 935 may determine, based on the monitoring, whether to transmit a sidelink response to the second UE on a transmission beam over the first set of the control resources, the sidelink response including a positive sidelink response to the sidelink request or a negative sidelink response to the sidelink request, the positive sidelink response indicating that the set of the data resources are available and the negative sidelink response indicating that the set of the data resources are unavailable. In some examples, the sidelink response component 935 may determine, based on receiving the second sidelink request, whether to transmit a sidelink response to the third UE, the sidelink response indicating a positive response to the second sidelink request to reserve the set of the data resources or a negative response to the second sidelink request to reserve the set of the data resources.

The transmitter 940 may transmit signals generated by other components of the device 905. In some examples, the transmitter 940 may be collocated with a receiver 910 in a transceiver component. For example, the transmitter 940 may be an example of aspects of the transceiver 1120 described with reference to FIG. 11. The transmitter 940 may utilize a single antenna or a set of antennas.

Figure 10:
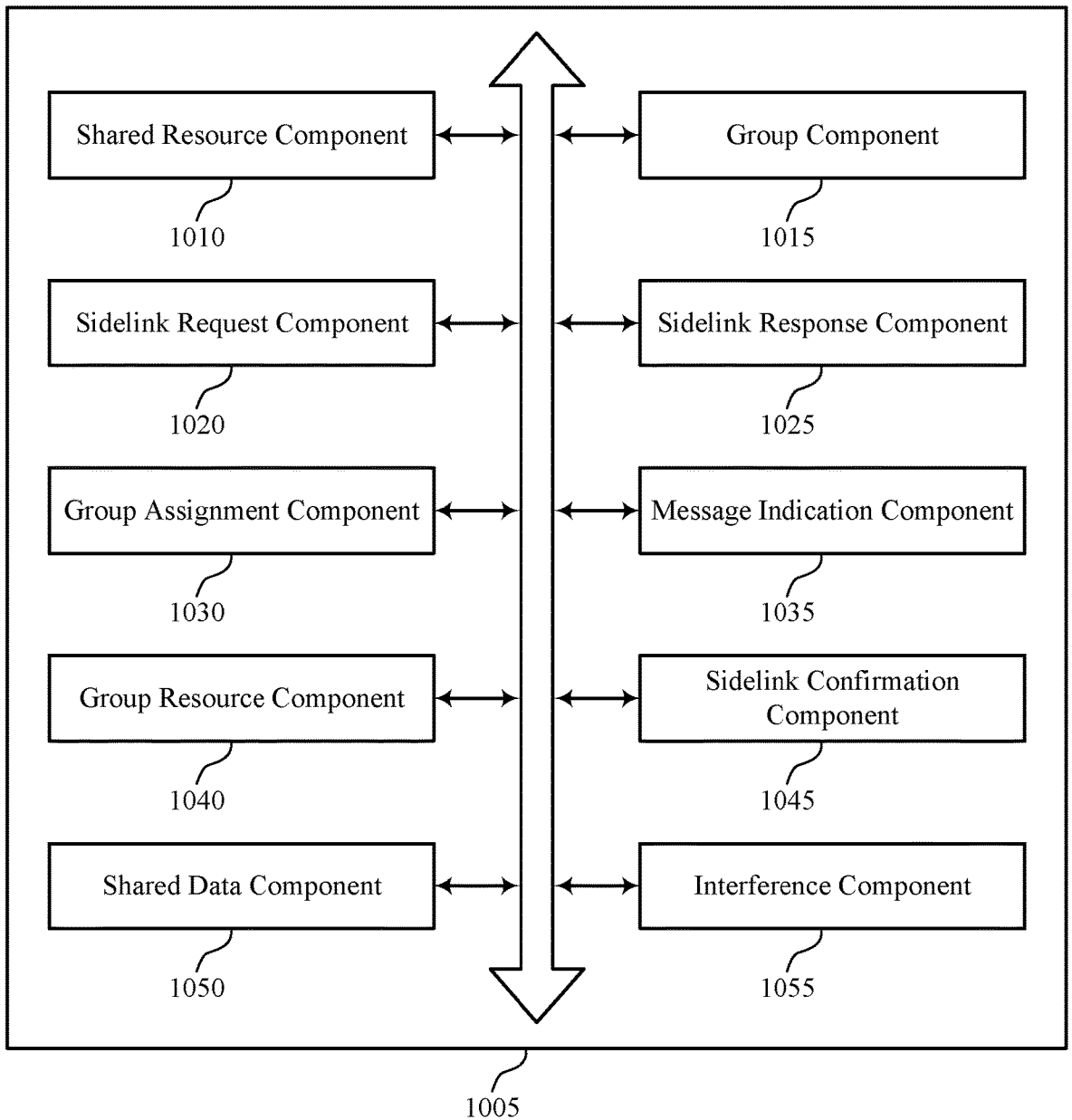
FIG. 10 shows a block diagram of a communications manager that supports control signaling techniques for sidelink communications in accordance with aspects of the present disclosure.

FIG. 10 shows a block diagram of a communications manager 1005 that supports control signaling techniques for sidelink communications in accordance with aspects of the present disclosure. The communications manager 1005 may be an example of aspects of a communications manager 815, a communications manager 915, or a communications manager 1110 described herein. The communications manager 1005 may include a shared resource component 1010, a group component 1015, a sidelink request component 1020, a sidelink response component 1025, a group assignment component 1030, a message indication component 1035, a group resource component 1040, a sidelink confirmation component 1045, a shared data component 1050, and an interference component 1055. Each of these components may communicate, directly or indirectly, with one another (for example, via one or more buses).

The shared resource component 1010 may determine shared resources for communicating over one or more sidelink communication links, the shared resources including control resources and data resources. In some examples, the shared resource component 1010 may determine shared resources for communicating over one or more sidelink communication links, the shared resources including control resources and data resources. In some examples, the shared resource component 1010 may determine shared resources for communicating over one or more sidelink communication links, the shared resources including control resources and data resources.

The group component 1015 may determine a first set of the control resources in a first frequency band corresponding to a first group of UEs, the first group of UEs including the first UE. In some examples, the group component 1015 may determine a first set of the control resources in a first frequency band corresponding to a first group of UEs, the first group of UEs including the first UE and a second UE. In some examples, the group component 1015 may determine a first set of the control resources in a first frequency band corresponding to a first group of UEs, the first group of UEs including the first UE and a second UE. In some examples, the group component 1015 may receive an indication, from a base station, that the first UE is assigned to the first group of UEs, where determining the first set of the control resources in the first frequency band is based on the indication. In some examples, the group component 1015 may determine that the first control block is allocated to the first UE based on the indication. In some examples, the group component 1015 may receive, from a UE, a signal indicating that the first UE is assigned to the first group of UEs, where determining the first set of the control resources is based on the received signal. In some examples, determining a second set of the control resources in a second frequency band corresponding to a second group of UEs, where the second group of UEs includes the first UE.

In some examples, the group component 1015 may both the first group of UEs and a second group of UEs include the first UE. In some examples, the group component 1015 may receive an indication, from a base station, that the first UE is assigned to the first group of UEs, where determining the first set of the control resources in the first frequency band is based on the indication. In some examples, the group component 1015 may determine that the first control block is allocated to the second UE based on the indication. In some examples, the group component 1015 may receive, from a UE, a signal indicating that the first UE is assigned to the first group of UEs, where determining the first set of the control resources is based on the received signal. In some examples, determining a second set of the control resources in a second frequency band corresponding to a second group of UEs, where the second group of UEs includes the first UE and a third UE.

In some examples, the group component 1015 may receive an indication from a base station that the first UE is assigned to the second group of UEs, where determining the second set of the control resources in the second frequency band is based on the indication. In some examples, the group component 1015 may receive an indication, from a base station, that the first UE is assigned to the first group of UEs, where determining the first set of the control resources in the first frequency band is based on the indication. In some examples, the group component 1015 may receive, from a UE, a signal indicating that the first UE is assigned to the first group of UEs, where determining the first set of the control resources is based on the received signal. In some examples, the signal, indication, or both indicate that the first control block is allocated to the first UE. In some examples, a second group of UEs is associated with a higher priority than the first group of UEs, and a second frequency band corresponding to the second group of UEs is higher in frequency than the first frequency band on the second group of UEs being associated with a higher priority than the first group of UEs. In some examples, the first control block of the first set of the control resources is associated with a higher priority than a second control block of the first set of control resources allocated to the second UE, and the first control block is before the second control block based on the first control block being associated with the higher priority than the second control block. In some examples, the signal, indication, or both indicate that the first control block is allocated to the second UE.

In some examples, the first set of the control resources in the first frequency band corresponding to the first group of UEs is different than a second set of the control resources in a second frequency band corresponding to a second group of UEs. In some examples, the first control block of the first set of the control resources is before a second control block of the first set of the control resources allocated to the first UE, and where the first control block is associated with a higher priority than the second control block based on the first control block of the first set of the control resources being before the second control block of the first set of the control resources. In some examples, a first frequency band is higher in frequency than the second frequency band, and where a first group of UEs is associated with a higher priority than the second group of UEs based on the first frequency band being higher in frequency than the second frequency band.

The sidelink request component 1020 may transmit, to a second UE in the first group of UEs on a transmission beam over a first control block of the first set of the control resources, a sidelink request to reserve a set of the data resources, where the first control block is allocated to the first UE. In some examples, the sidelink request component 1020 may monitor, on a receive beam over a first control block of the first set of the control resources, for a sidelink request from the second UE to reserve a set of the data resources, the first control block allocated to the second UE and the sidelink request indicating that the first UE is a target UE of the sidelink request. In some examples, the sidelink request component 1020 may monitor, on a receive beam over the first set of the control resources in the first frequency band, for a first sidelink request from the second UE. In some examples, the sidelink request component 1020 may receive, based on the monitoring, a second sidelink request from a third UE to reserve a set of the data resources, the second sidelink request indicating that a fourth UE is a target UE of the second sidelink request, a second group of UEs including the third UE and the fourth UE. In some examples, the sidelink request component 1020 may transmit, to a third UE in the second group of UEs on the transmission beam over a second control block of the second set of the control resources, a second sidelink request to reserve a second set of the data resources, where the second control block is allocated to the first UE. In some examples, the sidelink request component 1020 may monitor, by the first UE on a second receive beam over a second set of the control resources in a second frequency band, for one or more sidelink requests from one or more UEs in the second group of UEs, the second set of the control resources corresponding to the second group of UEs.

In some examples, the sidelink request component 1020 may monitor, on a receive beam over a second control block of the second set of the control resources, for a second sidelink request from the third UE to reserve a second set of the data resources, where the second control block is allocated to the third UE and the second sidelink request indicates that the first UE is a target UE of the second sidelink request. In some examples, the sidelink request component 1020 may monitor, by the first UE on a second receive beam over a second set of the control resources in a second frequency band, for one or more sidelink requests from each UE in the second group of UEs, the second set of the control resources corresponding to the second group of UEs. In some examples, the sidelink request component 1020 may receive a second sidelink request to reserve the set of the data resources from a third UE, where the first group or the second group include the third UE.

In some examples, the sidelink request component 1020 may monitor, by the first UE on a second receive beam over a second set of the control resources in a second frequency band, for a sidelink request from each UE in the second group of UEs, the second set of the control resources corresponding to the second group of UEs. In some examples, the sidelink request component 1020 may determine, based on receiving the second sidelink request, that the first UE is not the target UE of the second sidelink request, where determining whether to transmit the sidelink response to the third UE is based on determining that the first UE is not the target UE. In some examples, the sidelink request component 1020 may receive, on the receive beam over the first set of the control resources in the first frequency band, the first sidelink request to reserve the set of the data resources from the second UE.

The sidelink response component 1025 may monitor, by the first UE on a receive beam over the first set of the control resources, for one or more sidelink responses. In some examples, the sidelink response component 1025 may determine, based on the monitoring, whether to transmit a sidelink response to the second UE on a transmission beam over the first set of the control resources, the sidelink response including a positive sidelink response to the sidelink request or a negative sidelink response to the sidelink request, the positive sidelink response indicating that the set of the data resources are available and the negative sidelink response indicating that the set of the data resources are unavailable. In some examples, the sidelink response component 1025 may determine, based on receiving the second sidelink request, whether to transmit a sidelink response to the third UE, the sidelink response indicating a positive response to the second sidelink request to reserve the set of the data resources or a negative response to the second sidelink request to reserve the set of the data resources.

In some examples, the sidelink response component 1025 may receive, based on the monitoring, a positive sidelink response of the one or more sidelink responses from the second UE. In some examples, the sidelink response component 1025 may receive, based on the monitoring, a negative sidelink response of the one or more sidelink responses from a third UE. In some examples, the sidelink response component 1025 may transmit, based on determining whether to transmit the sidelink response, the sidelink response to the second UE on the transmission beam over the first control block of the first set of the control resources. In some examples, the sidelink response component 1025 may transmit, based on determining the level of interference between the first transmission from the third UE and the second transmission from the second UE, the positive sidelink response to the second UE or the negative sidelink response to the second UE.

In some examples, the sidelink response component 1025 may refrain, based on determining that the first UE is not the target UE, from transmitting the sidelink response to the third UE. In some examples, the sidelink response component 1025 may transmit, to the second UE on a transmission beam over the first set of the control resources in the first frequency band, a second negative sidelink response, where determining whether to transmit the sidelink response to the third UE is based on a measured interference between a first transmission from the second UE and a second transmission from the third UE. In some examples, the sidelink response component 1025 may transmit, to the second UE on a transmission beam over the first set of the control resources in the first frequency band, a second positive sidelink response, where determining whether to transmit the sidelink response to the third UE is based on a measured interference between a first transmission from the second UE and a second transmission from the third UE. In some examples, the sidelink request is transmitted during a first portion of the first control block, the positive sidelink response is received during a second portion of the first control block, and a sidelink confirmation is transmitted during a third portion of the first control block.

The group assignment component 1030 may assign a set of UEs to the first group of UEs, the set of UEs including the first UE and the second UE. In some examples, the group assignment component 1030 may allocate each of a set of control blocks of the first set of the control resources in the first frequency band to each of the set of UEs. In some examples, the group assignment component 1030 may transmit, to the set of UEs, a signal indicating the set of control blocks, indicating that the set of UEs are assigned to the first group of UEs, or both. In some examples, the group assignment component 1030 may assign a set of UEs to the first group of UEs, the set of UEs including the second UE and the first UE.

In some examples, the group assignment component 1030 may allocate each of a set of control blocks of the first set of the control resources in the first frequency band to each of the set of UEs. In some examples, the group assignment component 1030 may transmit, to the set of UEs, a signal indicating the set of control blocks, indicating that the set of UEs are assigned to the first group of UEs, or both. In some examples, the group assignment component 1030 may assign a set of UEs to the first group of UEs, the a set of UEs including the first UE and the second UE. In some examples, the group assignment component 1030 may allocate each of a set of control blocks of the first set of the control resources in the first frequency band to the a set of UEs. In some examples, the group assignment component 1030 may transmit, to the a set of UEs, a signal indicating the set of control blocks, that the set of UEs are assigned to the first group of UEs, or both.

The message indication component 1035 may transmit a signal to a base station indicating that the first UE has a message for transmission to the third UE.

The group resource component 1040 may receive an indication from the base station that the first UE is assigned to the second group of UEs in response to the signal, where determining the second set of the control resources in the second frequency band is based on the indication.

The sidelink confirmation component 1045 may transmit, based on receiving the positive sidelink response from the second UE, a sidelink confirmation to the second UE over the first set of the control resources in the first frequency band. In some examples, the sidelink confirmation component 1045 may refrain, based on receiving the negative sidelink response, from transmitting a sidelink confirmation to the second UE over the first set of the control resources in the first frequency band. In some examples, the sidelink request is transmitted during a first portion of the first control block, the positive sidelink response is received during a second portion of the first control block, and the sidelink confirmation is transmitted during a third portion of the first control block.

The shared data component 1050 may transmit, to one or more UEs, data over the data resources concurrently with a UE of the second group of UEs transmitting over the control resources in the first frequency band.

In some examples, the shared data component 1050 may transmit, to one or more UEs, data over the data resources concurrently with a UE of the second group of UEs transmitting over the control resources in the first frequency band.

In some examples, the shared data component 1050 may transmit, to one or more UEs, data over the data resources concurrently with a UE of the second group of UEs transmitting over the control resources in the second frequency band.

The interference component 1055 may determine, based on receiving the second sidelink request, a level of interference between a first transmission from the third UE and a second transmission from the second UE.

Figure 11:
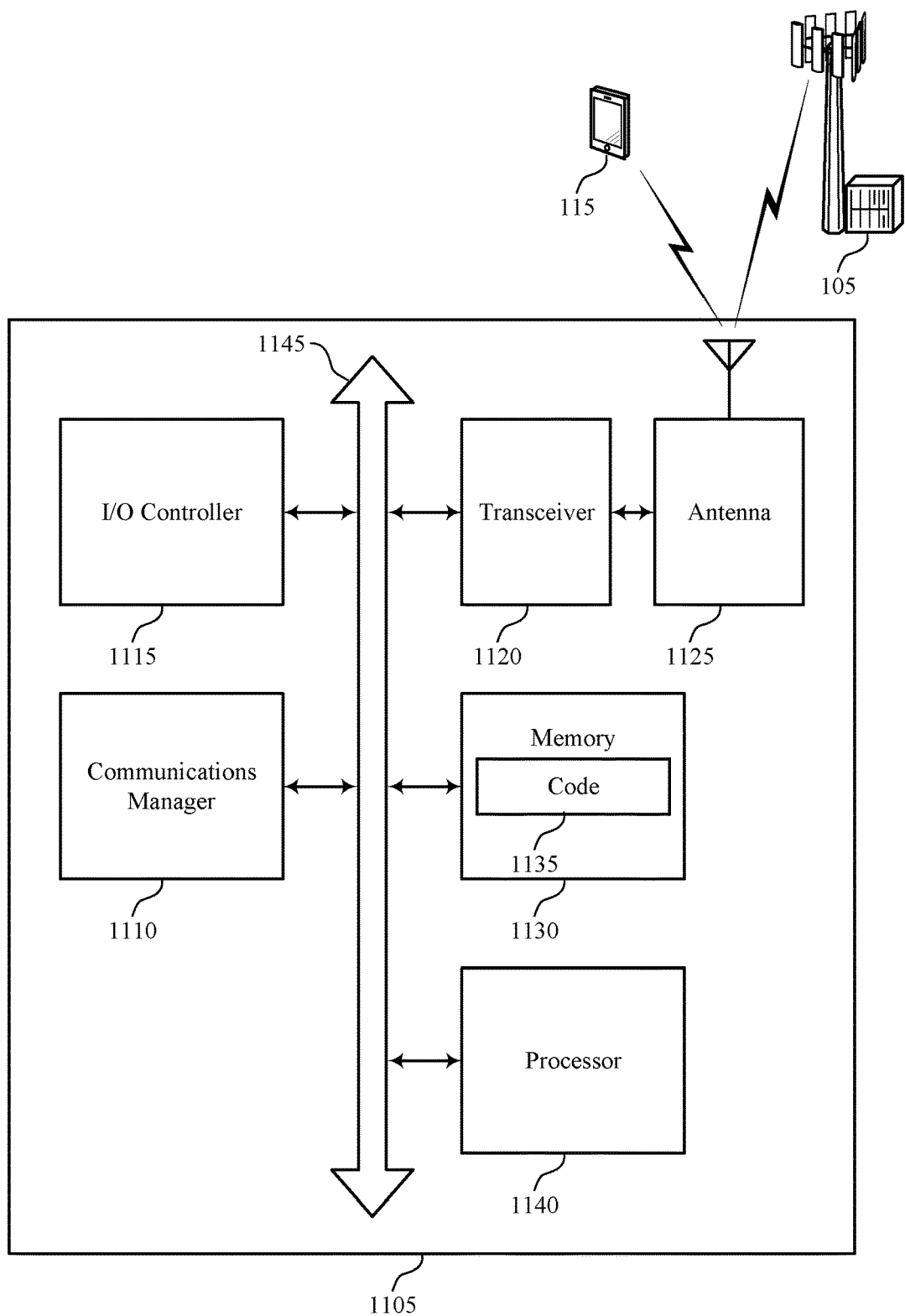
FIG. 11 shows a diagram of a system including a device that supports control signaling techniques for sidelink communications in accordance with aspects of the present disclosure.

FIG. 11 shows a diagram of a system 1100 including a device 1105 that supports control signaling techniques for sidelink communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (for example, bus 1145).

The communications manager 1110 may determine shared resources for communicating over one or more sidelink communication links, the shared resources including control resources and data resources, determine a first set of the control resources in a first frequency band corresponding to a first group of UEs, the first group of UEs including the first UE, transmit, to a second UE in the first group of UEs on a transmission beam over a first control block of the first set of the control resources, a sidelink request to reserve a set of the data resources, where the first control block is allocated to the first UE, and monitor, by the first UE on a receive beam over the first set of the control resources, for one or more sidelink responses. The communications manager 1110 may also determine shared resources for communicating over one or more sidelink communication links, the shared resources including control resources and data resources, determine a first set of the control resources in a first frequency band corresponding to a first group of UEs, the first group of UEs including the first UE and a second UE, monitor, on a receive beam over a first control block of the first set of the control resources, for a sidelink request from the second UE to reserve a set of the data resources, the first control block allocated to the second UE and the sidelink request indicating that the first UE is a target UE of the sidelink request, and determine, based on the monitoring, whether to transmit a sidelink response to the second UE on a transmission beam over the first set of the control resources, the sidelink response including a positive sidelink response to the sidelink request or a negative sidelink response to the sidelink request, the positive sidelink response indicating that the set of the data resources are available and the negative sidelink response indicating that the set of the data resources are unavailable. The communications manager 1110 may also determine shared resources for communicating over one or more sidelink communication links, the shared resources including control resources and data resources, determine a first set of the control resources in a first frequency band corresponding to a first group of UEs, the first group of UEs including the first UE and a second UE, monitor, on a receive beam over the first set of the control resources in the first frequency band, for a first sidelink request from the second UE, receive, based on the monitoring, a second sidelink request from a third UE to reserve a set of the data resources, the second sidelink request indicating that a fourth UE is a target UE of the second sidelink request, a second group of UEs including the third UE and the fourth UE, and determine, based on receiving the second sidelink request, whether to transmit a sidelink response to the third UE, the sidelink response indicating a positive response to the second sidelink request to reserve the set of the data resources or a negative response to the second sidelink request to reserve the set of the data resources.

The I/O controller 1115 may manage input and output signals for the device 1105. The I/O controller 1115 may also manage peripherals not integrated into the device 1105. In some examples, the I/O controller 1115 may represent a physical connection or port to an external peripheral. In some examples, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some examples, the I/O controller 1115 may be implemented as part of a processor. In some examples, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some examples, the wireless device may include a single antenna 1125. However, in some examples the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some examples, the memory 1130 may contain, among other things, a basic input/output system (BIOS) which may control basic hardware or software operation such as the interaction with peripheral components or devices.

The processor 1140 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1140 may be configured to operate a memory array using a memory controller. In other cases, a memory controller may be integrated into the processor 1140. The processor 1140 may be configured to execute computer-readable instructions stored in a memory (for example, the memory 1130) to cause the device 1105 to perform various functions (for example, functions or tasks supporting control signaling techniques for sidelink communications).

The code 1135 may include instructions to implement aspects of the present disclosure, including instructions to support wireless communications. The code 1135 may be stored in a non-transitory computer-readable medium such as system memory or other type of memory. In some examples, the code 1135 may not be directly executable by the processor 1140 but may cause a computer (for example, when compiled and executed) to perform functions described herein.

Figure 12:
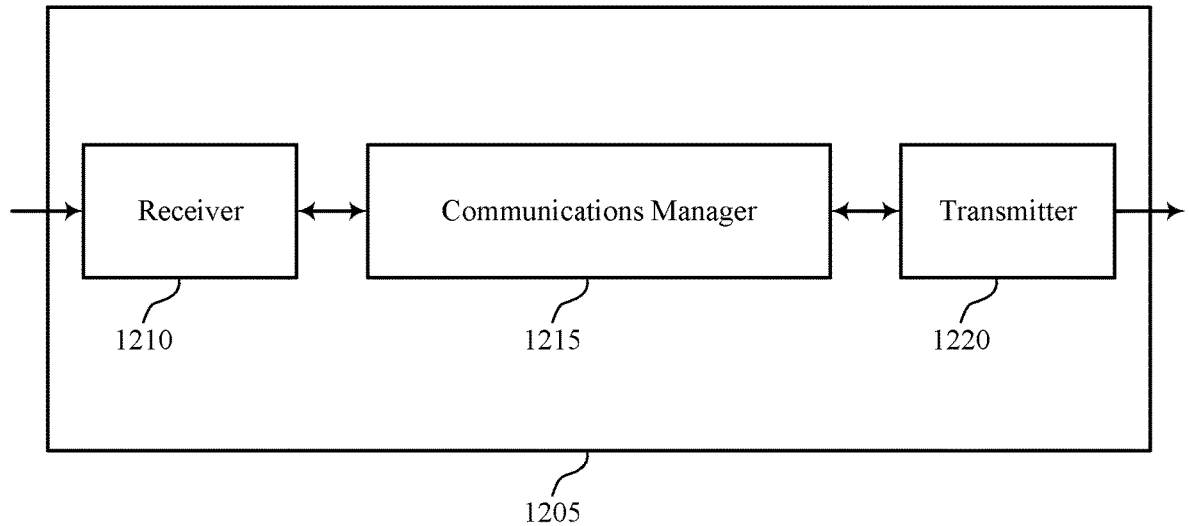
FIGS. 12 and 13 show block diagrams of devices that support control signaling techniques for sidelink communications in accordance with aspects of the present disclosure.

FIG. 12 shows a block diagram of a device 1205 that supports control signaling techniques for sidelink communications in accordance with aspects of the present disclosure. The device 1205 may be an example of aspects of a base station 105 as described herein. The device 1205 may include a receiver 1210, a communications manager 1215, and a transmitter 1220. The communications manager 1215 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to control signaling techniques for sidelink communications, among other examples). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may determine shared resources for sidelink communications between at least a first UE and a second UE, the shared resources including control resources and data resources, assign the first UE to a first group of UEs and the second UE to a second group of UEs, where the first group of UEs is associated with a first set of the control resources in a first frequency band and the second group of UEs is associated with a second set of the control resources in a second frequency band, and transmit an indication, to at least one of the first UE or the second UE, that the first UE is assigned to the first group of UEs, or that the second UE is assigned to the second group of UEs, or both. The communications manager 1215 may be an example of aspects of the communications manager 1510 described herein.

The communications manager 1215, or its sub-components, may be implemented in hardware, code (for example, software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at different locations, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver component. For example, the transmitter 1220 may be an example of aspects of the transceiver 1520 described with reference to FIG. 15. The transmitter 1220 may utilize a single antenna or a set of antennas.

Figure 13:
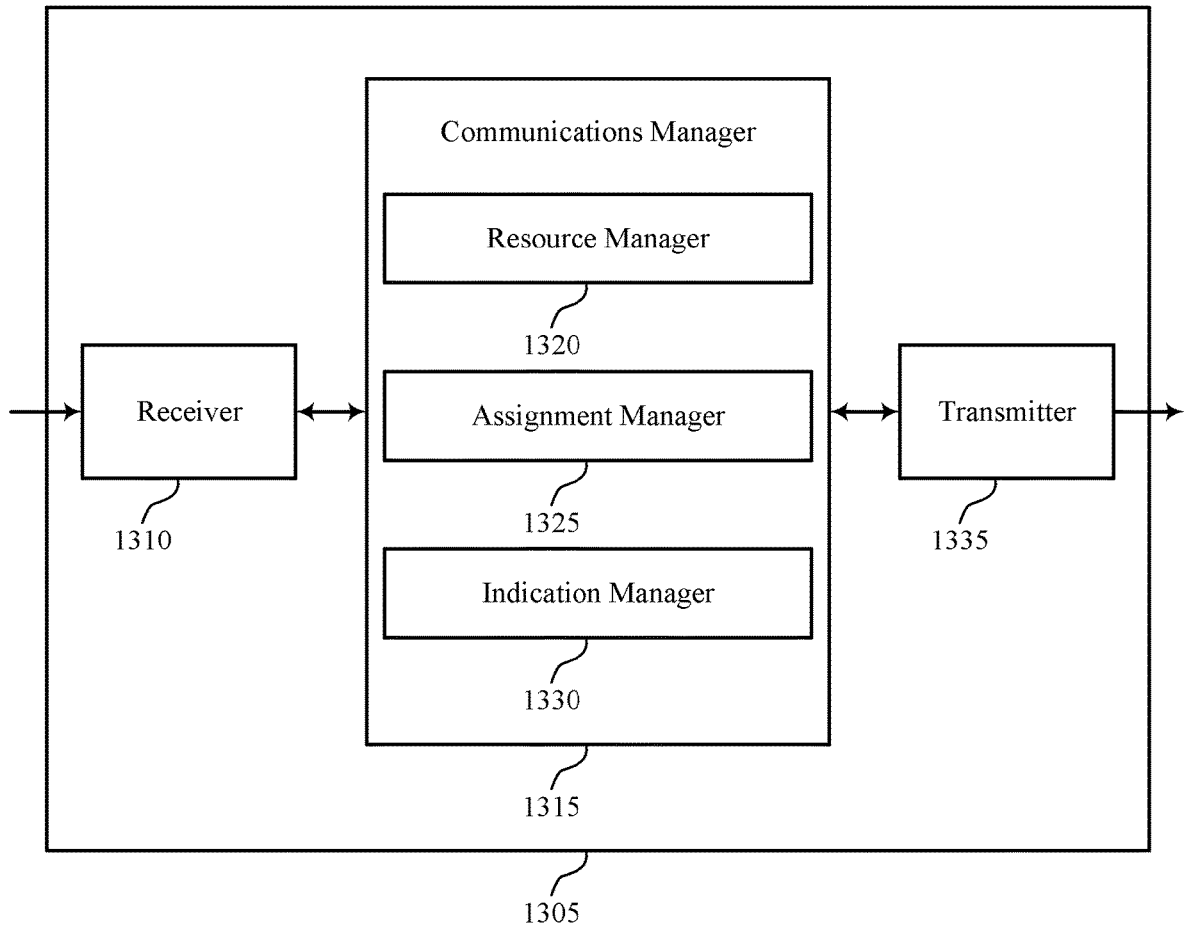

FIG. 13 shows a block diagram of a device 1305 that supports control signaling techniques for sidelink communications in accordance with aspects of the present disclosure. The device 1305 may be an example of aspects of a device 1205, or a base station 105 as described herein. The device 1305 may include a receiver 1310, a communications manager 1315, and a transmitter 1335. The communications manager 1315 can be implemented, at least in part, by one or both of a modem and a processor. Each of these components may be in communication with one another (for example, via one or more buses).

The receiver 1310 may receive information such as packets, user data, or control information associated with various information channels (for example, control channels, data channels, and information related to control signaling techniques for sidelink communications, among other examples). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a resource manager 1320, an assignment manager 1325, and an indication manager 1330. The communications manager 1315 may be an example of aspects of the communications manager 1510 described herein.

The resource manager 1320 may determine shared resources for sidelink communications between at least a first UE and a second UE, the shared resources including control resources and data resources.

The assignment manager 1325 may assign the first UE to a first group of UEs and the second UE to a second group of UEs, where the first group of UEs is associated with a first set of the control resources in a first frequency band and the second group of UEs is associated with a second set of the control resources in a second frequency band.

The indication manager 1330 may transmit an indication, to at least one of the first UE or the second UE, that the first UE is assigned to the first group of UEs, or that the second UE is assigned to the second group of UEs, or both.

The transmitter 1335 may transmit signals generated by other components of the device 1305. In some examples, the transmitter 1335 may be collocated with a receiver 1310 in a transceiver component. For example, the transmitter 1335 may be an example of aspects of the transceiver 1520 described with reference to FIG. 15. The transmitter 1335 may utilize a single antenna or a set of antennas.

Figure 14:
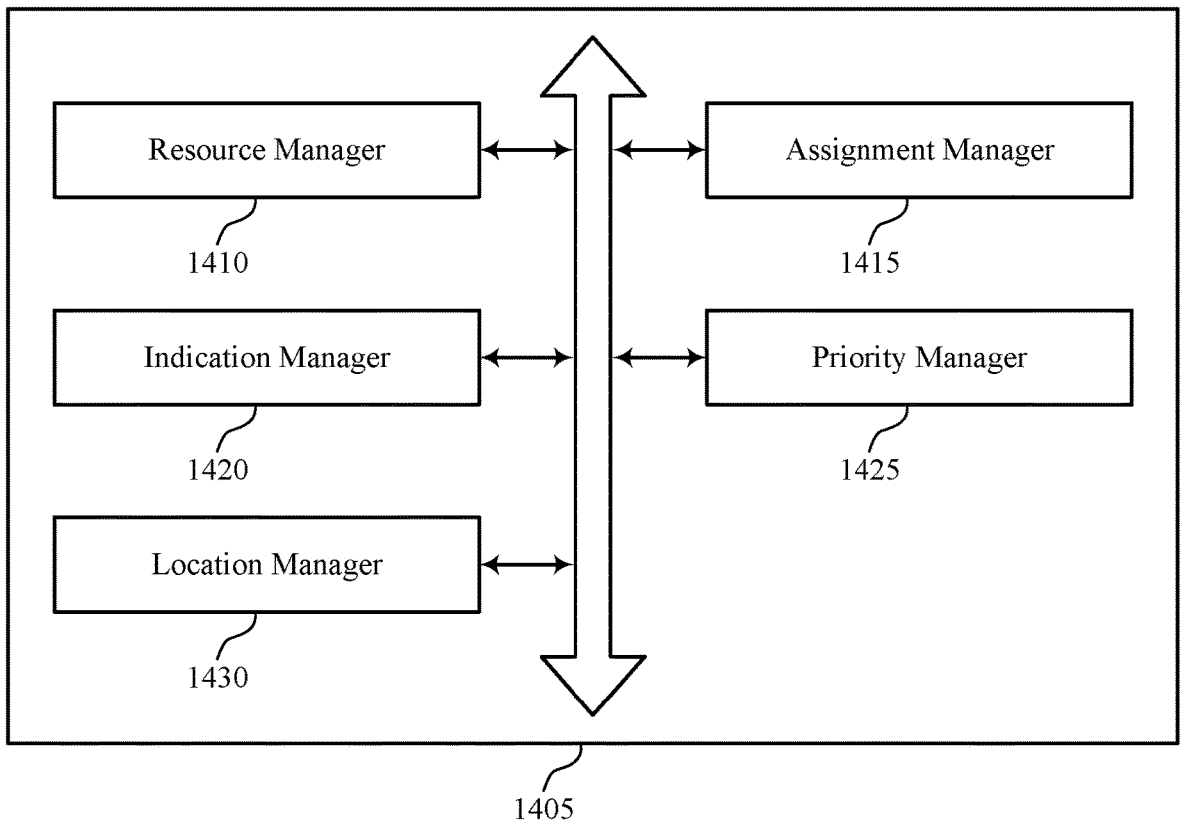
FIG. 14 shows a block diagram of a communications manager that supports control signaling techniques for sidelink communications in accordance with aspects of the present disclosure.

FIG. 14 shows a block diagram of a communications manager 1405 that supports control signaling techniques for sidelink communications in accordance with aspects of the present disclosure. The communications manager 1405 may be an example of aspects of a communications manager 1215, a communications manager 1315, or a communications manager 1510 described herein. The communications manager 1405 may include a resource manager 1410, an assignment manager 1415, an indication manager 1420, a priority manager 1425, and a location manager 1430. Each of these components may communicate, directly or indirectly, with one another (for example, via one or more buses).

The resource manager 1410 may determine shared resources for sidelink communications between at least a first UE and a second UE, the shared resources including control resources and data resources.

The assignment manager 1415 may assign the first UE to a first group of UEs and the second UE to a second group of UEs, where the first group of UEs is associated with a first set of the control resources in a first frequency band and the second group of UEs is associated with a second set of the control resources in a second frequency band.

In some examples, the assignment manager 1415 may assign the first UE to the first group of UEs based on the one or more locations. In some examples, the assignment manager 1415 may allocate a first control block of the first set of the control resources to the first UE. In some examples, the assignment manager 1415 may assign a third UE to the first group of UEs.

In some examples, the assignment manager 1415 may allocate, based on determining that the first priority of the first UE is higher than the second priority of the third UE, the third UE to a second control block of the first set of the control resources in the first frequency band, where the second control block is after the first control block. In some examples, the first group of UEs includes a different quantity of UEs than the second group of UEs.

The indication manager 1420 may transmit an indication, to at least one of the first UE or the second UE, that the first UE is assigned to the first group of UEs, or that the second UE is assigned to the second group of UEs, or both. In some examples, the indication manager 1420 may transmit an indication to at least one of the first group of UEs that the first control block is allocated to the first UE.

The priority manager 1425 may determine a first priority associated with the first UE and a second priority associated with the second UE, where assigning the first UE to the first group of UEs and the second UE to the second group of UEs is based on the first priority and the second priority. In some examples, the priority manager 1425 may determine that a first priority of the first UE is higher than a second priority of the third UE. In some examples, the first priority is higher than the second priority and the first frequency band includes a higher frequency than the second frequency band.

The location manager 1430 may determine one or more locations of one or more UEs.

Figure 15:
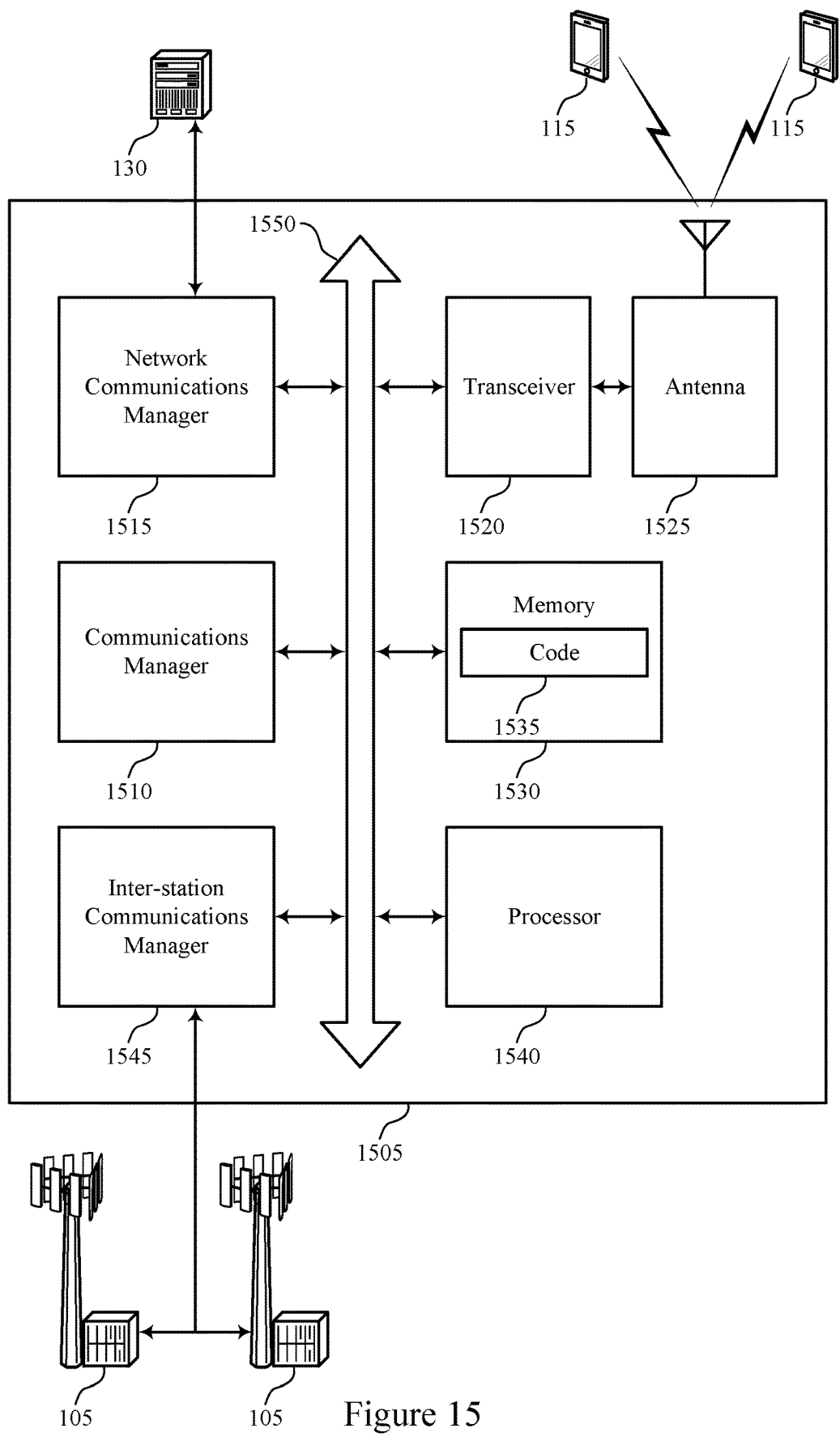
FIG. 15 shows a diagram of a system including a device that supports control signaling techniques for sidelink communications in accordance with aspects of the present disclosure.

FIG. 15 shows a diagram of a system 1500 including a device 1505 that supports control signaling techniques for sidelink communications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (for example, bus 1550).

The communications manager 1510 may determine shared resources for sidelink communications between at least a first UE and a second UE, the shared resources including control resources and data resources, assign the first UE to a first group of UEs and the second UE to a second group of UEs, where the first group of UEs is associated with a first set of the control resources in a first frequency band and the second group of UEs is associated with a second set of the control resources in a second frequency band, and transmit an indication, to at least one of the first UE or the second UE, that the first UE is assigned to the first group of UEs, or that the second UE is assigned to the second group of UEs, or both.

The network communications manager 1515 may manage communications with the core network (for example, via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some examples, the wireless device may include a single antenna 1525. However, in some examples the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (for example, the processor 1540) cause the device to perform various functions described herein. In some examples, the memory 1530 may contain, among other things, a BIOS which may control basic hardware or software operation such as the interaction with peripheral components or devices.

The processor 1540 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory array using a memory controller. In some examples, a memory controller may be integrated into processor 1540. The processor 1540 may be configured to execute computer-readable instructions stored in a memory (for example, the memory 1530) to cause the device 1505 to perform various functions (for example, functions or tasks supporting control signaling techniques for sidelink communications).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some examples, the code 1535 may not be directly executable by the processor 1540 but may cause a computer (for example, when compiled and executed) to perform functions described herein.

Figure 16:
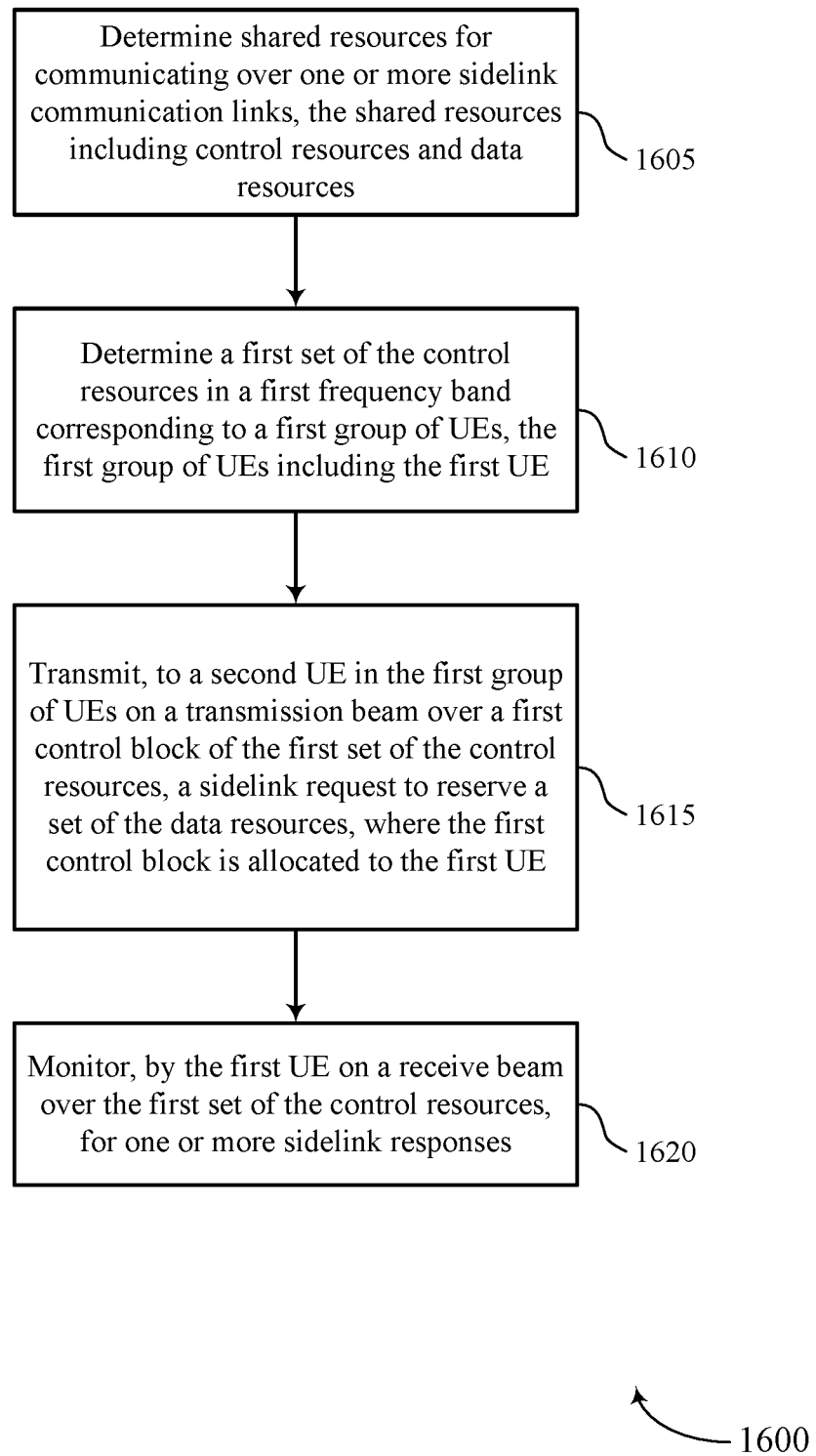
FIGS. 16 through 19 show flowcharts illustrating methods that support control signaling techniques for sidelink communications in accordance with aspects of the present disclosure.

FIG. 16 shows a flowchart illustrating a method 1600 that supports control signaling techniques for sidelink communications in accordance with aspects of the present disclosure. The operations of method 1600 may be implemented by a UE 115 or its components as described herein. For example, the operations of method 1600 may be performed by a communications manager as described with reference to FIGS. 8-11. In some examples, a UE may execute a set of instructions to control the functional elements of the UE to perform the functions described below. Additionally or alternatively, a UE may perform aspects of the functions described below using special-purpose hardware.

At 1605, the UE may determine shared resources for communicating over one or more sidelink communication links, the shared resources including control resources and data resources. The operations of 1605 may be performed according to the methods described herein. In some examples, aspects of the operations of 1605 may be performed by a shared resource component as described with reference to FIGS. 8-11.

At 1610, the UE may determine a first set of the control resources in a first frequency band corresponding to a first group of UEs, the first group of UEs including the first UE. The operations of 1610 may be performed according to the methods described herein. In some examples, aspects of the operations of 1610 may be performed by a group component as described with reference to FIGS. 8-11.

At 1615, the UE may transmit, to a second UE in the first group of UEs on a transmission beam over a first control block of the first set of the control resources, a sidelink request to reserve a set of the data resources, where the first control block is allocated to the first UE. The operations of 1615 may be performed according to the methods described herein. In some examples, aspects of the operations of 1615 may be performed by a sidelink request component as described with reference to FIGS. 8-11.

At 1620, the UE may monitor, by the first UE on a receive beam over the first set of the control resources, for one or more sidelink responses. The operations of 1620 may be performed according to the methods described herein. In some examples, aspects of the operations of 1620 may be performed by a sidelink response component as described with reference to FIGS. 8-11.

Figure 17:
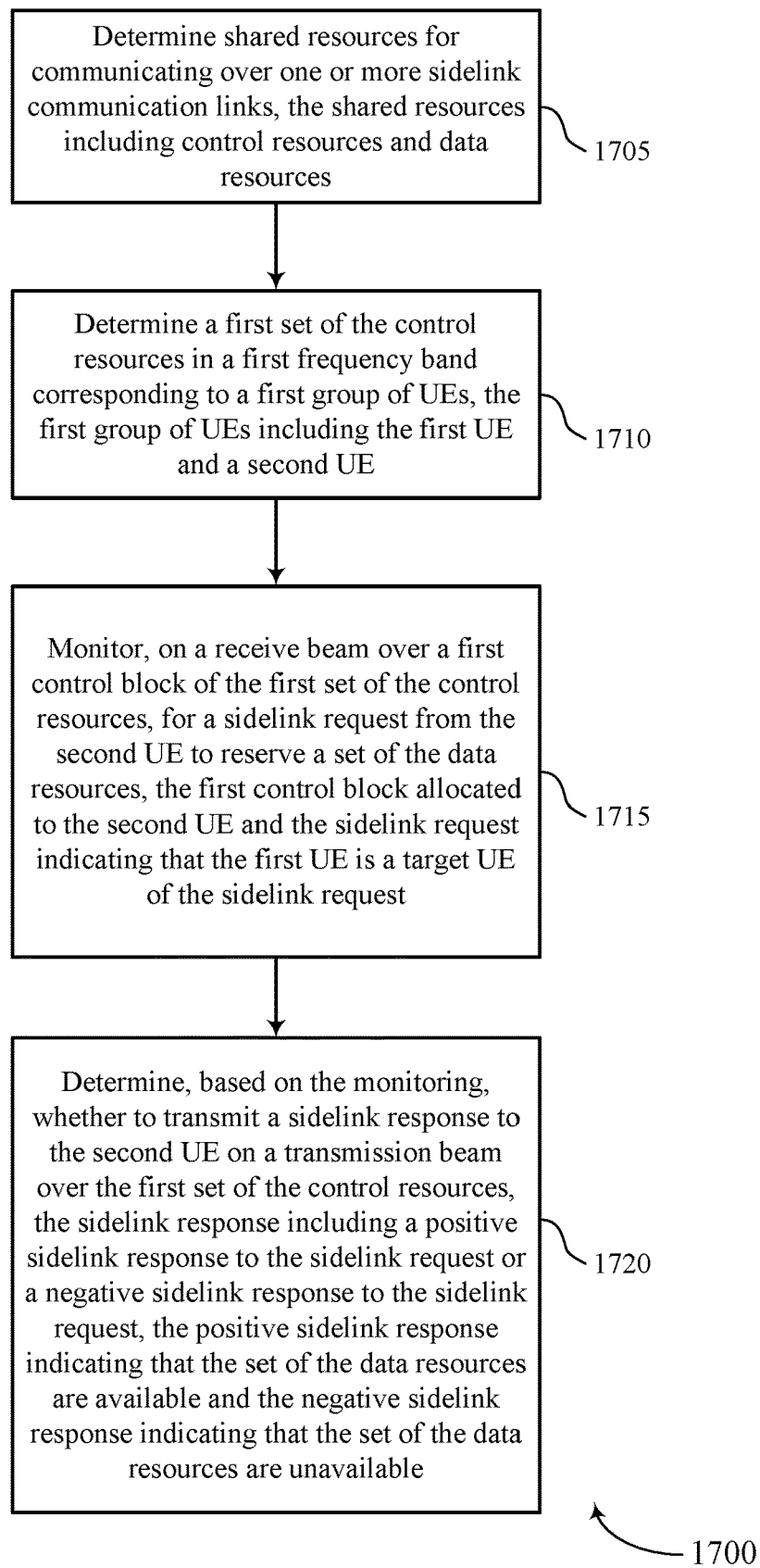

FIG. 17 shows a flowchart illustrating a method 1700 that supports control signaling techniques for sidelink communications in accordance with aspects of the present disclosure. The operations of method 1700 may be implemented by a UE 115 or its components as described herein. For example, the operations of method 1700 may be performed by a communications manager as described with reference to FIGS. 8-11. In some examples, a UE may execute a set of instructions to control the functional elements of the UE to perform the functions described below. Additionally or alternatively, a UE may perform aspects of the functions described below using special-purpose hardware.

At 1705, the UE may determine shared resources for communicating over one or more sidelink communication links, the shared resources including control resources and data resources. The operations of 1705 may be performed according to the methods described herein. In some examples, aspects of the operations of 1705 may be performed by a shared resource component as described with reference to FIGS. 8-11.

At 1710, the UE may determine a first set of the control resources in a first frequency band corresponding to a first group of UEs, the first group of UEs including the first UE and a second UE. The operations of 1710 may be performed according to the methods described herein. In some examples, aspects of the operations of 1710 may be performed by a group component as described with reference to FIGS. 8-11.

At 1715, the UE may monitor, on a receive beam over a first control block of the first set of the control resources, for a sidelink request from the second UE to reserve a set of the data resources, the first control block allocated to the second UE and the sidelink request indicating that the first UE is a target UE of the sidelink request. The operations of 1715 may be performed according to the methods described herein. In some examples, aspects of the operations of 1715 may be performed by a sidelink request component as described with reference to FIGS. 8-11.

At 1720, the UE may determine, based on the monitoring, whether to transmit a sidelink response to the second UE on a transmission beam over the first set of the control resources, the sidelink response including a positive sidelink response to the sidelink request or a negative sidelink response to the sidelink request, the positive sidelink response indicating that the set of the data resources are available and the negative sidelink response indicating that the set of the data resources are unavailable. The operations of 1720 may be performed according to the methods described herein. In some examples, aspects of the operations of 1720 may be performed by a sidelink response component as described with reference to FIGS. 8-11.

Figure 18:
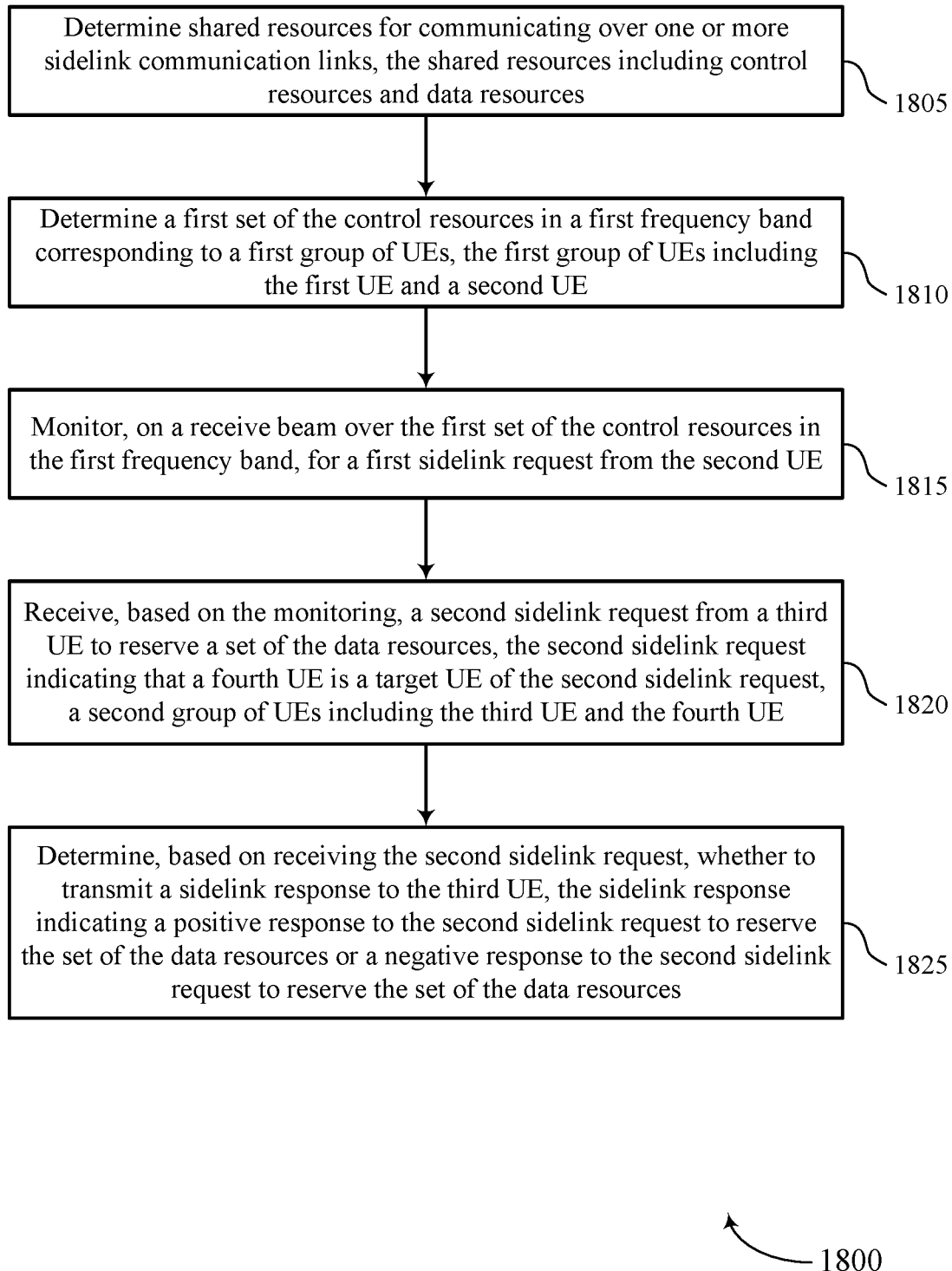

FIG. 18 shows a flowchart illustrating a method 1800 that supports control signaling techniques for sidelink communications in accordance with aspects of the present disclosure. The operations of method 1800 may be implemented by a UE 115 or its components as described herein. For example, the operations of method 1800 may be performed by a communications manager as described with reference to FIGS. 8-11. In some examples, a UE may execute a set of instructions to control the functional elements of the UE to perform the functions described below. Additionally or alternatively, a UE may perform aspects of the functions described below using special-purpose hardware.

At 1805, the UE may determine shared resources for communicating over one or more sidelink communication links, the shared resources including control resources and data resources. The operations of 1805 may be performed according to the methods described herein. In some examples, aspects of the operations of 1805 may be performed by a shared resource component as described with reference to FIGS. 8-11.

At 1810, the UE may determine a first set of the control resources in a first frequency band corresponding to a first group of UEs, the first group of UEs including the first UE and a second UE. The operations of 1810 may be performed according to the methods described herein. In some examples, aspects of the operations of 1810 may be performed by a group component as described with reference to FIGS. 8-11.

At 1815, the UE may monitor, on a receive beam over the first set of the control resources in the first frequency band, for a first sidelink request from the second UE. The operations of 1815 may be performed according to the methods described herein. In some examples, aspects of the operations of 1815 may be performed by a sidelink request component as described with reference to FIGS. 8-11.

At 1820, the UE may receive, based on the monitoring, a second sidelink request from a third UE to reserve a set of the data resources, the second sidelink request indicating that a fourth UE is a target UE of the second sidelink request, a second group of UEs including the third UE and the fourth UE. The operations of 1820 may be performed according to the methods described herein. In some examples, aspects of the operations of 1820 may be performed by a sidelink request component as described with reference to FIGS. 8-11.

At 1825, the UE may determine, based on receiving the second sidelink request, whether to transmit a sidelink response to the third UE, the sidelink response indicating a positive response to the second sidelink request to reserve the set of the data resources or a negative response to the second sidelink request to reserve the set of the data resources. The operations of 1825 may be performed according to the methods described herein. In some examples, aspects of the operations of 1825 may be performed by a sidelink response component as described with reference to FIGS. 8-11.

Figure 19:
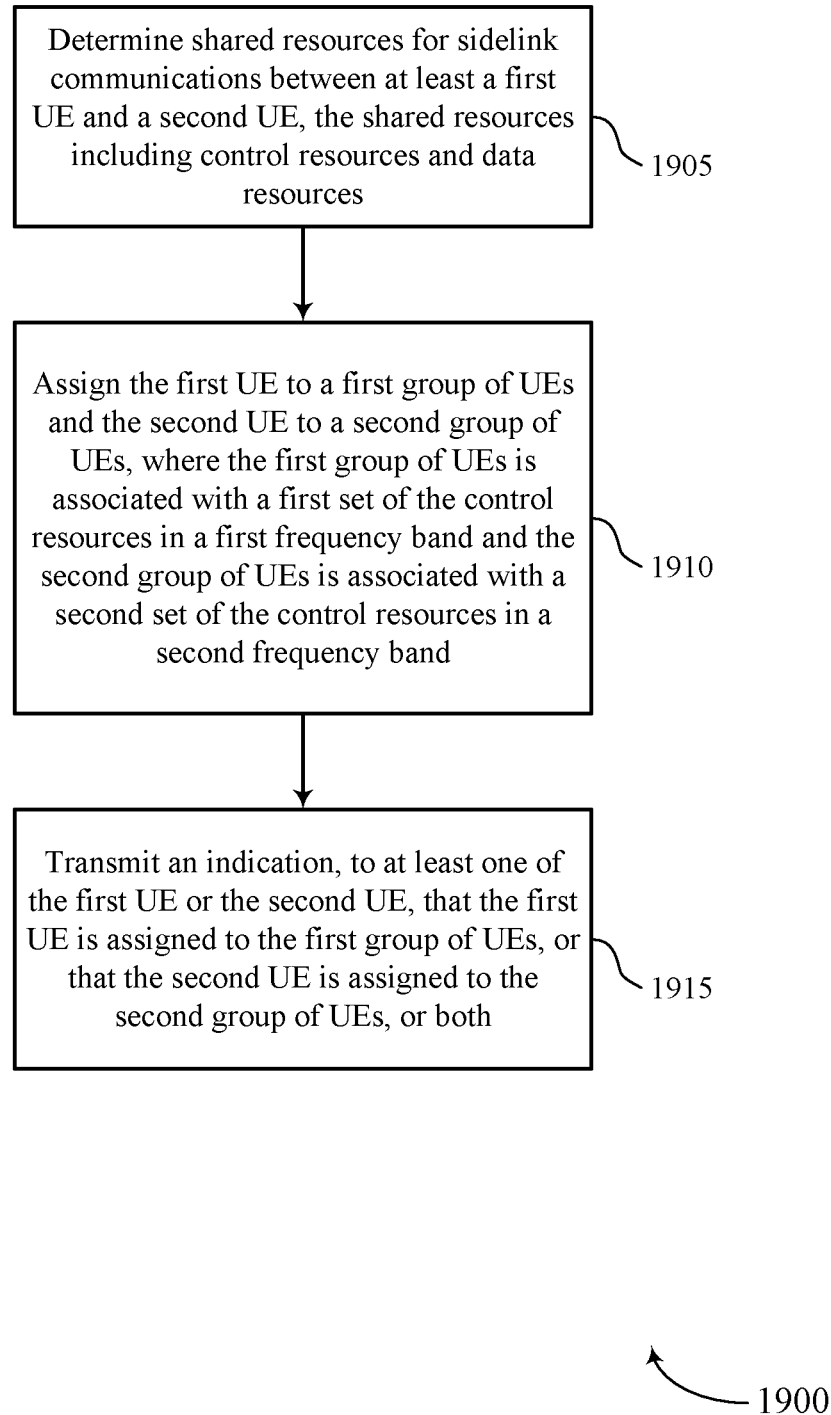

FIG. 19 shows a flowchart illustrating a method 1900 that supports control signaling techniques for sidelink communications in accordance with aspects of the present disclosure. The operations of method 1900 may be implemented by a base station 105 or its components as described herein. For example, the operations of method 1900 may be performed by a communications manager as described with reference to FIGS. 12-15. In some examples, a base station may execute a set of instructions to control the functional elements of the base station to perform the functions described below. Additionally or alternatively, a base station may perform aspects of the functions described below using special-purpose hardware.

At 1905, the base station may determine shared resources for sidelink communications between at least a first UE and a second UE, the shared resources including control resources and data resources. The operations of 1905 may be performed according to the methods described herein. In some examples, aspects of the operations of 1905 may be performed by a resource manager as described with reference to FIGS. 12-15.

At 1910, the base station may assign the first UE to a first group of UEs and the second UE to a second group of UEs, where the first group of UEs is associated with a first set of the control resources in a first frequency band and the second group of UEs is associated with a second set of the control resources in a second frequency band. The operations of 1910 may be performed according to the methods described herein. In some examples, aspects of the operations of 1910 may be performed by an assignment manager as described with reference to FIGS. 12-15.

At 1915, the base station may transmit an indication, to at least one of the first UE or the second UE, that the first UE is assigned to the first group of UEs, or that the second UE is assigned to the second group of UEs, or both. The operations of 1915 may be performed according to the methods described herein. In some examples, aspects of the operations of 1915 may be performed by an indication manager as described with reference to FIGS. 12-15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first UE, comprising: determining shared resources for communicating over one or more sidelink communication links, the shared resources comprising control resources and data resources; determining a first set of the control resources in a first frequency band corresponding to a first group of UEs, the first group of UEs comprising the first UE; transmitting, to a second UE in the first group of UEs on a transmission beam over a first control block of the first set of the control resources, a sidelink request to reserve a set of the data resources, wherein the first control block is allocated to the first UE; and monitoring, by the first UE on a receive beam over the first set of the control resources, for one or more sidelink responses.

Aspect 2: The method of aspect 1, further comprising: receiving an indication, from a base station, that the first UE is assigned to the first group of UEs, wherein determining the first set of the control resources in the first frequency band is based at least in part on the indication; and determining that the first control block is allocated to the first UE based at least in part on the indication.

Aspect 3: The method of aspect 1, further comprising: assigning a plurality of UEs to the first group of UEs, the plurality of UEs comprising the first UE and the second UE; allocating each of a plurality of control blocks of the first set of the control resources in the first frequency band to a respective UE of the plurality of UEs; and transmitting, to the plurality of UEs, an indication of the plurality of control blocks, an indication that the plurality of UEs are assigned to the first group of UEs, or both.

Aspect 4: The method of aspect 1, further comprising: receiving an indication, from a UE, that the first UE is assigned to the first group of UEs, wherein determining the first set of the control resources is based at least in part on the indication; and determining that the first control block is allocated to the first UE based at least in part on the indication.

Aspect 5: The method of aspect 4, wherein the indication indicates that the first control block is allocated to the first UE.

Aspect 6: The method of any of aspects 1 through 5, further comprising: transmitting a signal to a base station indicating that the first UE has a message for transmission to a third UE; receiving an indication from the base station that the first UE is assigned to a second group of UEs in response to the signal; determining a second set of the control resources in a second frequency band corresponding to the second group of UEs based at least in part on the indication, wherein the second group of UEs comprises the first UE; and transmitting, to a third UE in the second group of UEs on the transmission beam over a second control block of the second set of the control resources, a second sidelink request to reserve a second set of the data resources, wherein the second control block is allocated to the first UE.

Aspect 7: The method of any of aspects 1 through 6, wherein a second group of UEs is associated with a higher priority than the first group of UEs, and wherein a second frequency band corresponding to the second group of UEs is higher in frequency than the first frequency band based at least in part on the second group of UEs being associated with a higher priority than the first group of UEs.

Aspect 8: The method of any of aspects 1 through 7, wherein the first control block of the first set of the control resources is associated with a higher priority than a second control block of the first set of control resources allocated to the second UE, and wherein the first control block is before the second control block based at least in part on the first control block being associated with the higher priority than the second control block.

Aspect 9: The method of any of aspects 1 through 8, wherein both the first group of UEs and a second group of UEs comprise the first UE, further comprising monitoring, by the first UE on a second receive beam over a second set of the control resources in a second frequency band, for one or more sidelink requests from one or more UEs in the second group of UEs, the second set of the control resources corresponding to the second group of UEs.

Aspect 10: The method of aspect 1, further comprising: receiving, based at least in part on the monitoring, a positive sidelink response of the one or more sidelink responses from the second UE; and transmitting, based at least in part on receiving the positive sidelink response from the second UE, a sidelink confirmation to the second UE over the first set of the control resources in the first frequency band, wherein the sidelink request is transmitted during a first portion of the first control block, the positive sidelink response is received during a second portion of the first control block, and the sidelink confirmation is transmitted during a third portion of the first control block.

Aspect 11: The method of aspect 1, further comprising: receiving, based at least in part on the monitoring, a negative sidelink response of the one or more sidelink responses from a third UE; and refraining, based at least in part on receiving the negative sidelink response, from transmitting a sidelink confirmation to the second UE over the first set of the control resources in the first frequency band.

Aspect 12: The method of aspect 1, wherein the first group of UEs comprises a different quantity of UEs than a second group of UEs, the method further comprising: transmitting, to one or more UEs, data over the data resources concurrently with a UE of the second group of UEs transmitting over the control resources in the first frequency band.

Aspect 13: A method for wireless communications at a first UE, comprising: determining shared resources for communicating over one or more sidelink communication links, the shared resources comprising control resources and data resources; determining a first set of the control resources in a first frequency band corresponding to a first group of UEs, the first group of UEs comprising the first UE and a second UE; monitoring, on a receive beam over a first control block of the first set of the control resources, for a sidelink request from the second UE to reserve a set of the data resources, the first control block allocated to the second UE and the sidelink request indicating that the first UE is a target UE of the sidelink request; and determining, based at least in part on the monitoring, whether to transmit a sidelink response to the second UE on a transmission beam over the first set of the control resources, the sidelink response comprising a positive sidelink response to the sidelink request or a negative sidelink response to the sidelink request, the positive sidelink response indicating that the set of the data resources are available and the negative sidelink response indicating that the set of the data resources are unavailable.

Aspect 14: The method of aspect 13, further comprising: receiving an indication, from a base station, that the first UE is assigned to the first group of UEs, wherein determining the first set of the control resources in the first frequency band is based at least in part on the indication; and determining that the first control block is allocated to the second UE based at least in part on the indication.

Aspect 15: The method of aspect 13, further comprising: assigning a plurality of UEs to the first group of UEs, the plurality of UEs comprising the second UE and the first UE; allocating each of a plurality of control blocks of the first set of the control resources in the first frequency band to a respective UE of the plurality of UEs; and transmitting, to the plurality of UEs, an indication of the plurality of control blocks, an indication that the plurality of UEs are assigned to the first group of UEs, or both.

Aspect 16: The method of aspect 13, further comprising: receiving an indication, from a UE, that the first UE is assigned to the first group of UEs, wherein determining the first set of the control resources is based at least in part on the indication; and determining that the first control block is allocated to the first UE based at least in part on the indication.

Aspect 17: The method of aspect 16, wherein the indication indicates that the first control block is allocated to the second UE.

Aspect 18: The method of any of aspects 13 through 17, further comprising: receiving an indication from a base station that the first UE is assigned to a second group of UEs; determining a second set of the control resources in a second frequency band corresponding to the second group of UEs based at least in part on the indication, wherein the second group of UEs comprises the first UE and a third UE; and monitoring, on a receive beam over a second control block of the second set of the control resources, for a second sidelink request from the third UE to reserve a second set of the data resources, wherein the second control block is allocated to the third UE and the second sidelink request indicates that the first UE is a target UE of the second sidelink request.

Aspect 19: The method of any of aspects 13 through 18, wherein the first set of the control resources in the first frequency band corresponding to the first group of UEs is different than a second set of the control resources in a second frequency band corresponding to a second group of UEs.

Aspect 20: The method of any of aspects 13 through 19, wherein the first control block of the first set of the control resources is associated with a higher priority than a second control block of the first set of control resources allocated to the second UE, and wherein the first control block is before the second control block based at least in part on the first control block being associated with the higher priority than the second control block.

Aspect 21: The method of any of aspects 13 through 20, wherein both the first group of UEs and a second group of UEs comprise the first UE, further comprising monitoring, by the first UE on a second receive beam over a second set of the control resources in a second frequency band, for one or more sidelink requests from each UE in the second group of UEs, the second set of the control resources corresponding to the second group of UEs.

Aspect 22: The method of aspect 13, further comprising transmitting, based at least in part on determining whether to transmit the sidelink response, the sidelink response to the second UE on the transmission beam over the first control block of the first set of the control resources, wherein the sidelink request is transmitted during a first portion of the first control block, the positive sidelink response is received during a second portion of the first control block, and a sidelink confirmation is transmitted during a third portion of the first control block.

Aspect 23: The method of aspect 13, further comprising: receiving a second sidelink request to reserve the set of the data resources from a third UE, wherein the first group or a second group comprise the third UE; determining, based at least in part on receiving the second sidelink request, a level of interference between a first transmission from the third UE and a second transmission from the second UE; and transmitting, based at least in part on determining the level of interference between the first transmission from the third UE and the second transmission from the second UE, the positive sidelink response to the second UE or the negative sidelink response to the second UE.

Aspect 24: The method of aspect 13, wherein the first group of UEs comprises a different quantity of UEs than a second group of UEs, further comprising transmitting, to one or more UEs, data over the data resources concurrently with a UE of the second group of UEs transmitting over the control resources in the first frequency band.

Aspect 25: A method for wireless communications at a first UE, comprising: determining shared resources for communicating over one or more sidelink communication links, the shared resources comprising control resources and data resources; determining a first set of the control resources in a first frequency band corresponding to a first group of UEs, the first group of UEs comprising the first UE and a second UE; monitoring, on a receive beam over the first set of the control resources in the first frequency band, for a first sidelink request from the second UE; receiving, based at least in part on the monitoring, a second sidelink request from a third UE to reserve a set of the data resources, the second sidelink request indicating that a fourth UE is a target UE of the second sidelink request, a second group of UEs comprising the third UE and the fourth UE; and determining, based at least in part on receiving the second sidelink request, whether to transmit a sidelink response to the third UE, the sidelink response indicating a positive response to the second sidelink request to reserve the set of the data resources or a negative response to the second sidelink request to reserve the set of the data resources.

Aspect 26: The method of aspect 25, further comprising receiving an indication, from a base station, that the first UE is assigned to the first group of UEs, wherein determining the first set of the control resources in the first frequency band is based at least in part on the indication.

Aspect 27: The method of aspect 25, further comprising: assigning a plurality of UEs to the first group of UEs, the a plurality of UEs comprising the first UE and the second UE; allocating each of a plurality of control blocks of the first set of the control resources in the first frequency band to the a plurality of UEs; and transmitting, to the a plurality of UEs, an indication of the plurality of control blocks, an indication that the plurality of UEs are assigned to the first group of UEs, or both.

Aspect 28: The method of aspect 25, further comprising: receiving an indication, from a UE, that the first UE is assigned to the first group of UEs, wherein determining the first set of the control resources is based at least in part on the indication; and determining that the first control block is allocated to the first UE based at least in part on the indication.

Aspect 29: The method of any of aspects 25 through 28, wherein a first frequency band is higher in frequency than the second frequency band, and a first group of UEs is associated with a higher priority than the second group of UEs based at least in part on the first frequency band being higher in frequency than the second frequency band.

Aspect 30: The method of aspect 25, wherein both the second group of UEs and the first group of UEs comprise the first UE, further comprising monitoring, by the first UE on a second receive beam over a second set of the control resources in a second frequency band, for a sidelink request from each UE in the second group of UEs, the second set of the control resources corresponding to the second group of UEs.

Aspect 31: The method of aspect 25, further comprising: determining, based at least in part on receiving the second sidelink request, that the first UE is not the target UE of the second sidelink request, wherein determining whether to transmit the sidelink response to the third UE is based at least in part on determining that the first UE is not the target UE; and refraining, based at least in part on determining that the first UE is not the target UE, from transmitting the sidelink response to the third UE.

Aspect 32: The method of aspect 25, further comprising: receiving, on the receive beam over the first set of the control resources in the first frequency band, the first sidelink request to reserve the set of the data resources from the second UE; and transmitting, to the second UE on a transmission beam over the first set of the control resources in the first frequency band, a second negative sidelink response, wherein determining whether to transmit the sidelink response to the third UE is based at least in part on a measured interference between a first transmission from the second UE and a second transmission from the third UE.

Aspect 33: The method of aspect 25, further comprising: receiving, on the receive beam over the first set of the control resources in the first frequency band, the first sidelink request to reserve the set of the data resources from the second UE; and transmitting, to the second UE on a transmission beam over the first set of the control resources in the first frequency band, a second positive sidelink response, wherein determining whether to transmit the sidelink response to the third UE is based at least in part on a measured interference between a first transmission from the second UE and a second transmission from the third UE.

Aspect 34: The method of aspect 25, wherein the second group of UEs comprises a different quantity of UEs than the first group of UEs, further comprising transmitting, to one or more UEs, data over the data resources concurrently with a UE of the second group of UEs transmitting over the control resources in the second frequency band.

Aspect 35: A method for wireless communications at a base station, comprising: determining shared resources for sidelink communications between at least a first UE and a second UE, the shared resources comprising control resources and data resources; assigning the first UE to a first group of UEs and the second UE to a second group of UEs, wherein the first group of UEs is associated with a first set of the control resources in a first frequency band and the second group of UEs is associated with a second set of the control resources in a second frequency band; and transmitting an indication, to at least one of the first UE or the second UE, that the first UE is assigned to the first group of UEs, or that the second UE is assigned to the second group of UEs, or both.

Aspect 36: The method of aspect 35, further comprising determining a first priority associated with the first UE and a second priority associated with the second UE, wherein assigning the first UE to the first group of UEs and the second UE to the second group of UEs is based at least in part on the first priority and the second priority.

Aspect 37: The method of aspect 36, wherein the first priority is higher than the second priority and the first frequency band comprises a higher frequency than the second frequency band.

Aspect 38: The method of any of aspects 35 through 37, further comprising: determining one or more locations of one or more UEs; and assigning the first UE to the first group of UEs based on the one or more locations.

Aspect 39: The method of any of aspects 35 through 38, further comprising: allocating a first control block of the first set of the control resources to the first UE; and transmitting an indication to at least one of the first group of UEs that the first control block is allocated to the first UE.

Aspect 40: The method of aspect 39, further comprising: assigning a third UE to the first group of UEs; determining that a first priority of the first UE is higher than a second priority of the third UE; and allocating, based at least in part on determining that the first priority of the first UE is higher than the second priority of the third UE, the third UE to a second control block of the first set of the control resources in the first frequency band, wherein the second control block is after the first control block.

Aspect 41: The method of any of aspects 35 through 40, wherein the first group of UEs comprises a different quantity of UEs than the second group of UEs.

Aspect 42: An apparatus for wireless communications at a first UE, comprising a processor; memory coupled with the processor; and instructions stored in the memory and executable by the processor to cause the apparatus to perform a method of any of aspects 1 through 12.

Aspect 43: An apparatus for wireless communications at a first UE, comprising at least one means for performing a method of any of aspects 1 through 12.

Aspect 44: A non-transitory computer-readable medium storing code for wireless communications at a first UE, the code comprising instructions executable by a processor to perform a method of any of aspects 1 through 12.

Aspect 45: An apparatus for wireless communications at a first UE, comprising a processor; memory coupled with the processor; and instructions stored in the memory and executable by the processor to cause the apparatus to perform a method of any of aspects 13 through 24.

Aspect 46: An apparatus for wireless communications at a first UE, comprising at least one means for performing a method of any of aspects 13 through 24.

Aspect 47: A non-transitory computer-readable medium storing code for wireless communications at a first UE, the code comprising instructions executable by a processor to perform a method of any of aspects 13 through 24.

Aspect 48: An apparatus for wireless communications at a first UE, comprising a processor; memory coupled with the processor; and instructions stored in the memory and executable by the processor to cause the apparatus to perform a method of any of aspects 25 through 34.

Aspect 49: An apparatus for wireless communications at a first UE, comprising at least one means for performing a method of any of aspects 25 through 34.

Aspect 50: A non-transitory computer-readable medium storing code for wireless communications at a first UE, the code comprising instructions executable by a processor to perform a method of any of aspects 25 through 34.

Aspect 51: An apparatus for wireless communications at a base station, comprising a processor; memory coupled with the processor; and instructions stored in the memory and executable by the processor to cause the apparatus to perform a method of any of aspects 35 through 41.

Aspect 52: An apparatus for wireless communications at a base station, comprising at least one means for performing a method of any of aspects 35 through 41.

Aspect 53: A non-transitory computer-readable medium storing code for wireless communications at a base station, the code comprising instructions executable by a processor to perform a method of any of aspects 35 through 41.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:

determining shared resources for communicating over one or more sidelink communication links, the shared resources comprising control resources and data resources;

determining a first set of the control resources in a first frequency band corresponding to a first group of UEs, the first group of UEs comprising the first UE;

transmitting, to a second UE in the first group of UEs on a transmission beam over a first control block of the first set of the control resources, a sidelink request to reserve a set of the data resources, wherein the first control block is allocated to the first UE, wherein the first control block is associated with a higher priority than a second control block of the first set of the control resources allocated to the second UE, and wherein the first control block is before the second control block based at least in part on the first control block being associated with the higher priority than the second control block; and monitoring, by the first UE on a receive beam over the first set of the control resources, for one or more sidelink responses.

2. The method of claim 1, further comprising:

receiving an indication, from a base station, that the first UE is assigned to the first group of UEs, wherein determining the first set of the control resources in the first frequency band is based at least in part on the indication; and determining that the first control block is allocated to the first UE based at least in part on the indication.

3. The method of claim 1, further comprising:

assigning a plurality of UEs to the first group of UEs, the plurality of UEs comprising the first UE and the second UE;

allocating each of a plurality of control blocks of the first set of the control resources in the first frequency band to a respective UE of the plurality of UEs; and transmitting, to the plurality of UEs, an indication of the plurality of control blocks, an indication that the plurality of UEs is assigned to the first group of UEs, or both.

4. The method of claim 1, further comprising:

receiving an indication, from a UE, that the first UE is assigned to the first group of UEs, wherein determining the first set of the control resources is based at least in part on the indication; and determining that the first control block is allocated to the first UE based at least in part on the indication.

5. The method of claim 4, wherein the indication indicates that the first control block is allocated to the first UE.

6. The method of claim 1, wherein a second group of UEs is associated with a higher priority than the first group of UEs, and wherein a second frequency band corresponding to the second group of UEs is higher in frequency than the first frequency band based at least in part on the second group of UEs being associated with the higher priority than the first group of UEs.

7. The method of claim 1, wherein both the first group of UEs and a second group of UEs comprise the first UE, the method further comprising monitoring, by the first UE on a second receive beam over a second set of the control resources in a second frequency band, for one or more sidelink requests from one or more UEs in the second group of UEs, the second set of the control resources corresponding to the second group of UEs.

8. The method of claim 1, further comprising:
receiving, based at least in part on the monitoring, a negative sidelink response of the one or more sidelink responses from a third UE; and
refraining, based at least in part on receiving the negative sidelink response, from transmitting a sidelink confirmation to the second UE over the first set of the control resources in the first frequency band.

9. The method of claim 1, wherein the first group of UEs comprises a different quantity of UEs than a second group of UEs, the method further comprising:
transmitting, to one or more UEs, data over the data resources concurrently with a UE of the second group of UEs transmitting over the control resources in the first frequency band.

10. A method for wireless communications at a first user equipment (UE), comprising:
determining shared resources for communicating over one or more sidelink communication links, the shared resources comprising control resources and data resources;
determining a first set of the control resources in a first frequency band corresponding to a first group of UEs, the first group of UEs comprising the first UE;
transmitting, to a second UE in the first group of UEs on a transmission beam over a first control block of the first set of the control resources, a sidelink request to reserve a set of the data resources, wherein the first control block is allocated to the first UE;
monitoring, by the first UE on a receive beam over the first set of the control resources, for one or more sidelink responses;
transmitting a signal to a base station indicating that the first UE has a message for transmission to a third UE;
receiving an indication from the base station that the first UE is assigned to a second group of UEs in response to the signal;
determining a second set of the control resources in a second frequency band corresponding to the second group of UEs based at least in part on the indication, wherein the second group of UEs comprises the first UE and the third UE; and
transmitting, to the third UE on the transmission beam over a control block of the second set of the control resources, a second sidelink request to reserve a second set of the data resources, wherein the control block is allocated to the first UE.

11. A method for wireless communications at a first user equipment (UE), comprising:
determining shared resources for communicating over one or more sidelink communication links, the shared resources comprising control resources and data resources;
determining a first set of the control resources in a first frequency band corresponding to a first group of UEs, the first group of UEs comprising the first UE;
transmitting, to a second UE in the first group of UEs on a transmission beam over a first control block of the first set of the control resources, a sidelink request to reserve a set of the data resources, wherein the first control block is allocated to the first UE;
monitoring, by the first UE on a receive beam over the first set of the control resources, for one or more sidelink responses;
receiving, based at least in part on the monitoring, a positive sidelink response of the one or more sidelink responses from the second UE; and
transmitting, based at least in part on receiving the positive sidelink response from the second UE, a sidelink confirmation to the second UE over the first set of the control resources in the first frequency band, wherein the sidelink request is transmitted during a first portion of the first control block, the positive sidelink response is received during a second portion of the first control block, and the sidelink confirmation is transmitted during a third portion of the first control block.

12. A method for wireless communications at a first user equipment (UE), comprising:
determining shared resources for communicating over one or more sidelink communication links, the shared resources comprising control resources and data resources;
determining a first set of the control resources in a first frequency band corresponding to a first group of UEs, the first group of UEs comprising the first UE and a second UE;
monitoring, on a receive beam over a first control block of the first set of the control resources, for a sidelink request from the second UE to reserve a set of the data resources, the first control block allocated to the second UE and the sidelink request indicating that the first UE is a target UE of the sidelink request, wherein the first control block is associated with a higher priority than a second control block of the first set of the control resources allocated to the first UE, and wherein the first control block is before the second control block based at least in part on the first control block being associated with the higher priority than the second control block; and
determining, based at least in part on the monitoring, whether to transmit a sidelink response to the second UE on a transmission beam over the first set of the control resources, the sidelink response comprising a positive sidelink response to the sidelink request or a negative sidelink response to the sidelink request, the positive sidelink response indicating that the set of the data resources are available and the negative sidelink response indicating that the set of the data resources are unavailable.

13. The method of claim 12, further comprising:
receiving an indication, from a base station, that the first UE is assigned to the first group of UEs, wherein determining the first set of the control resources in the first frequency band is based at least in part on the indication; and determining that the first control block is allocated to the second UE based at least in part on the indication.

14. The method of claim 12, further comprising:
assigning a plurality of UEs to the first group of UEs, the plurality of UEs comprising the second UE and the first UE;
allocating each of a plurality of control blocks of the first set of the control resources in the first frequency band to a respective UE of the plurality of UEs; and
transmitting, to the plurality of UEs, an indication of the plurality of control blocks, an indication that the plurality of UEs is assigned to the first group of UEs, or both.

15. The method of claim 12, further comprising:
receiving an indication, from a UE, that the first UE is assigned to the first group of UEs, wherein determining the first set of the control resources is based at least in part on the indication; and
determining that the second control block is allocated to the first UE based at least in part on the indication.

16. The method of claim 15, wherein the indication indicates that the first control block is allocated to the second UE.

17. The method of claim 12, further comprising:
receiving an indication from a base station that the first UE is assigned to a second group of UEs;
determining a second set of the control resources in a second frequency band corresponding to the second group of UEs based at least in part on the indication, wherein the second group of UEs comprises the first UE and a third UE; and
monitoring, on a receive beam over a control block of the second set of the control resources, for a second sidelink request from the third UE to reserve a second set of the data resources, wherein the control block is allocated to the third UE and the second sidelink request indicates that the first UE is a target UE of the second sidelink request.

18. The method of claim 12, wherein the first set of the control resources in the first frequency band corresponding to the first group of UEs is different than a second set of the control resources in a second frequency band corresponding to a second group of UEs.

19. The method of claim 12, wherein both the first group of UEs and a second group of UEs comprise the first UE, further comprising monitoring, by the first UE on a second receive beam over a second set of the control resources in a second frequency band, for one or more sidelink requests from each UE in the second group of UEs, the second set of the control resources corresponding to the second group of UEs.

20. The method of claim 12, further comprising transmitting, based at least in part on determining whether to transmit the sidelink response, the sidelink response to the second UE on the transmission beam over the first control block of the first set of the control resources, wherein the sidelink request is transmitted during a first portion of the first control block, the positive sidelink response is received during a second portion of the first control block, and a sidelink confirmation is transmitted during a third portion of the first control block.

21. The method of claim 12, further comprising:
receiving a second sidelink request to reserve the set of the data resources from a third UE, wherein the first group or a second group comprise the third UE;
determining, based at least in part on receiving the second sidelink request, a level of interference between a first transmission from the third UE and a second transmission from the second UE; and
transmitting, based at least in part on determining the level of interference between the first transmission from the third UE and the second transmission from the second UE, the positive sidelink response to the second UE or the negative sidelink response to the second UE.

22. The method of claim 12, wherein the first group of UEs comprises a different quantity of UEs than a second group of UEs, further comprising transmitting, to one or more UEs, data over the data resources concurrently with a UE of the second group of UEs transmitting over the control resources in the first frequency band.

23. An apparatus for wireless communications at a first user equipment (UE), comprising:
a processor,
memory coupled with the processor; and
instructions stored in the memory and executable by the processor to cause the apparatus to:
determine shared resources for communicating over one or more sidelink communication links, the shared resources comprising control resources and data resources;
determine a first set of the control resources in a first frequency band corresponding to a first group of UEs, the first group of UEs comprising the first UE;
transmit, to a second UE in the first group of UEs on a transmission beam over a first control block of the first set of the control resources, a sidelink request to reserve a set of the data resources, wherein the first control block is allocated to the first UE, wherein the first control block is associated with a higher priority than a second control block of the first set of the control resources allocated to the second UE, and wherein the first control block is before the second control block based at least in part on the first control block being associated with the higher priority than the second control block; and
monitor, by the first UE on a receive beam over the first set of the control resources, for one or more sidelink responses.

24. The apparatus of claim 23, wherein the instructions are further executable by the processor to cause the apparatus to:
receive an indication, from a base station, that the first UE is assigned to the first group of UEs, wherein determining the first set of the control resources in the first frequency band is based at least in part on the indication; and
determine that the first control block is allocated to the first UE based at least in part on the indication.

25. The apparatus of claim 23, wherein the instructions are further executable by the processor to cause the apparatus to:
assign a plurality of UEs to the first group of UEs, the plurality of UEs comprising the first UE and the second UE;
allocate each of a plurality of control blocks of the first set of the control resources in the first frequency band to a respective UE of the plurality of UEs; and transmit, to the plurality of UEs, an indication of the plurality of control blocks, an indication that the plurality of UEs is assigned to the first group of UEs, or both.

26. An apparatus for wireless communications at a first user equipment (UE), comprising:
a processor,
memory coupled with the processor; and
instructions stored in the memory and executable by the processor to cause the apparatus to:
determine shared resources for communicating over one or more sidelink communication links, the shared resources comprising control resources and data resources;
determine a first set of the control resources in a first frequency band corresponding to a first group of UEs, the first group of UEs comprising the first UE and a second UE;
monitor, on a receive beam over a first control block of the first set of the control resources, for a sidelink request from the second UE to reserve a set of the data resources, the first control block allocated to the second UE and the sidelink request indicating that the first UE is a target UE of the sidelink request, wherein the first control block is associated with a higher priority than a second control block of the first set of the control resources allocated to the first UE, and wherein the first control block is before the second control block based at least in part on the first control block being associated with the higher priority than the second control block; and
determine, based at least in part on the monitoring, whether to transmit a sidelink response to the second UE on a transmission beam over the first set of the control resources, the sidelink response comprising a positive sidelink response to the sidelink request or a negative sidelink response to the sidelink request, the positive sidelink response indicating that the set of the data resources are available and the negative sidelink response indicating that the set of the data resources are unavailable.

27. The apparatus of claim 26, wherein the instructions are further executable by the processor to cause the apparatus to:
receive an indication, from a base station, that the first UE is assigned to the first group of UEs, wherein determining the first set of the control resources in the first frequency band is based at least in part on the indication; and
determine that the first control block is allocated to the second UE based at least in part on the indication.

28. The apparatus of claim 26, wherein the instructions are further executable by the processor to cause the apparatus to:
assign a plurality of UEs to the first group of UEs, the plurality of UEs comprising the second UE and the first UE;
allocate each of a plurality of control blocks of the first set of the control resources in the first frequency band to a respective UE of the plurality of UEs; and
transmit, to the plurality of UEs, an indication of the plurality of control blocks, an indication that the plurality of UEs is assigned to the first group of UEs, or both.

* * * * *